(12) United States Patent
Bindal et al.

(10) Patent No.: US 11,778,015 B2
(45) Date of Patent: *Oct. 3, 2023

(54) MULTI REQUEST ASYNCHRONOUS DELEGATION FOR ENHANCED PERFORMANCE

(71) Applicant: eBay Inc., San Jose, CA (US)

(72) Inventors: Vineet Bindal, San Jose, CA (US); Naga Sita Raghuram Nimishakavi Venkata, San Jose, CA (US); Ramesh Periyathambi, San Ramon, CA (US); Lakshimi Duraivenkatesh, San Ramon, CA (US); Tomer Lancewicki, Jersey City, NJ (US); Selcuk Kopru, San Jose, CA (US)

(73) Assignee: eBay Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/513,793

(22) Filed: Oct. 28, 2021

(65) Prior Publication Data
US 2022/0191267 A1 Jun. 16, 2022

Related U.S. Application Data

(63) Continuation of application No. 17/118,059, filed on Dec. 10, 2020, now Pat. No. 11,223,670.

(51) Int. Cl.
*H04L 67/02* (2022.01)
*H04L 9/40* (2022.01)
(Continued)

(52) U.S. Cl.
CPC .............. *H04L 67/02* (2013.01); *G06F 16/95* (2019.01); *H04L 63/0807* (2013.01); *H04L 67/01* (2022.05)

(58) Field of Classification Search
None
See application file for complete search history.

(56) References Cited

U.S. PATENT DOCUMENTS

| 7,346,667 | B2 * | 3/2008 | Ashcroft | ................. H04L 67/02 709/227 |
| 8,103,742 | B1 | 1/2012 | Green | |

(Continued)

OTHER PUBLICATIONS

Mihajlija, "Building the DOM faster: Speculative Parsing, Async, Defer and Preload", Mozilla Hacks—the Web developer blog, Retrieved from the Internet :<https://hacks.mozilla.org/2017/09/building-the-dom-faster-speculative-parsing-async-defer-and-preload/>, Sep. 14, 2017, 13 pages.

(Continued)

*Primary Examiner* — Lashonda Jacobs-Burton
(74) *Attorney, Agent, or Firm* — SHOOK, HARDY & BACON L.L.P.

(57) ABSTRACT

Systems and methods for processing webpage calls via multiple module responses are described. A system may receive, from a client device, a first call for module data associated with a set of webpage modules for presentation in a webpage. The system may subsequently transmit, to the client device based on receiving the first call, a first response including first module data associated with a first subset of the set of webpage modules. The first response may additionally include a token identifying the webpage. The server may additionally transmit, to the client device based on transmitting the first response, a second response including the token identifying the webpage and second module data associated with a second subset of the set of webpage modules that differs from the first subset of the set of webpage modules.

20 Claims, 11 Drawing Sheets

(51) Int. Cl.
*G06F 16/95* (2019.01)
*H04L 67/01* (2022.01)

(56) References Cited

U.S. PATENT DOCUMENTS

| | | | |
|---|---|---|---|
| 9,361,281 B2 | 6/2016 | Zhang et al. | |
| 9,471,705 B2 | 10/2016 | Jiang et al. | |
| 10,169,053 B2 | 1/2019 | Huang et al. | |
| 10,956,659 B1* | 3/2021 | Wexler | G06F 40/186 |
| 11,223,670 B1 | 1/2022 | Bindal et al. | |
| 2007/0219860 A1* | 9/2007 | Karls | G06Q 30/02 |
| | | | 705/14.69 |
| 2009/0282327 A1 | 11/2009 | Hamilton, II et al. | |
| 2010/0180192 A1* | 7/2010 | Hall | G06F 16/9577 |
| | | | 715/234 |
| 2012/0096079 A1* | 4/2012 | Brazile | G06F 16/958 |
| | | | 709/203 |
| 2012/0303697 A1 | 11/2012 | Alstad | |
| 2013/0212465 A1 | 8/2013 | Kovatch | |
| 2013/0311306 A1* | 11/2013 | Liu | G06Q 30/02 |
| | | | 707/E17.108 |
| 2014/0317482 A1* | 10/2014 | Sun | G06F 16/9577 |
| | | | 715/205 |
| 2017/0091336 A1 | 3/2017 | Royzner et al. | |
| 2018/0191798 A1* | 7/2018 | Zhu | G06F 40/186 |
| 2018/0210866 A1 | 7/2018 | Grigoryan et al. | |

OTHER PUBLICATIONS

Synchronous and Asynchronous Snippet Loading, Optimizely Knowledge Base, Retrieved from the Internet URL: <https://help.optimizely.com/Set_Up_Optimizely/Synchronous_and_asynchronous_snippet_loading>, Feb. 25, 2020, 5 pages.

First Action Interview Pre-interview Communication received for U.S. Appl. No. 17/118,059, dated Jun. 17, 2021, 4 pages.

Notice of Allowance received for U.S. Appl. No. 17/118,059, dated Aug. 26, 2021, 9 pages.

Notice of Allowance received for U.S. Appl. No. 17/118,059, dated Sep. 15, 2021, 10 pages.

* cited by examiner

MULTI REQUEST ASYNCHRONOUS DELEGATION FOR ENHANCED PERFORMANCE

CROSS REFERENCE TO RELATED APPLICATIONS

This application is a continuation of U.S. patent application Ser. No. 17/118,059 by Bindal et al., entitled "Multi Request Asynchronous Delegation for Enhanced Performance," filed Dec. 10, 2020, now U.S. Pat. No. 11,223,670, issued Jan. 11, 2022, which is incorporated herein by reference in its entirety.

FIELD OF TECHNOLOGY

The present disclosure relates generally to database systems and data processing, and more specifically to multi request asynchronous delegation for enhanced performance.

BACKGROUND

In a networked system, a client device may send a request, or a call, when attempting to access a webpage. A server may then process the call, retrieve the data associated with the webpage indicated by the call, and return the webpage data to the client device for display. However, some conventional systems rely on the client device to perform large quantities of the preprocessing burden of the webpage, which places a large burden on the client device. Additionally, delays attributable to portions of the webpage data that is to be returned may result in a bottleneck on the server side, thereby delaying the presentation of the webpage at the client device, as well as result in extra data charges for client devices associated with paid data connections.

SUMMARY

A method of computer-implemented method at a server is described. The method may include receiving, from a client device, a first call for module data associated with a set of webpage modules for presentation in a webpage, transmitting, to the client device based on receiving the first call, a first response including first module data associated with a first subset of the set of webpage modules, and a token identifying the webpage, the first response instructing the client device to display the first module data associated with the first subset of the set of webpage modules in the webpage, and transmitting, to the client device based on transmitting the first response, a second response including the token identifying the webpage and second module data associated with a second subset of the set of webpage modules that differs from the first subset of the set of webpage modules.

An apparatus for computer-implemented method at a server is described. The apparatus may include a processor, memory coupled with the processor, and instructions stored in the memory. The instructions may be executable by the processor to cause the apparatus to receive, from a client device, a first call for module data associated with a set of webpage modules for presentation in a webpage, transmit, to the client device based on receiving the first call, a first response including first module data associated with a first subset of the set of webpage modules, and a token identifying the webpage, the first response instructing the client device to display the first module data associated with the first subset of the set of webpage modules in the webpage, and transmit, to the client device based on transmitting the first response, a second response including the token identifying the webpage and second module data associated with a second subset of the set of webpage modules that differs from the first subset of the set of webpage modules.

Another apparatus for computer-implemented method at a server is described. The apparatus may include means for receiving, from a client device, a first call for module data associated with a set of webpage modules for presentation in a webpage, transmitting, to the client device based on receiving the first call, a first response including first module data associated with a first subset of the set of webpage modules, and a token identifying the webpage, the first response instructing the client device to display the first module data associated with the first subset of the set of webpage modules in the webpage, and transmitting, to the client device based on transmitting the first response, a second response including the token identifying the webpage and second module data associated with a second subset of the set of webpage modules that differs from the first subset of the set of webpage modules.

A non-transitory computer-readable medium storing code for computer-implemented method at a server is described. The code may include instructions executable by a processor to receive, from a client device, a first call for module data associated with a set of webpage modules for presentation in a webpage, transmit, to the client device based on receiving the first call, a first response including first module data associated with a first subset of the set of webpage modules, and a token identifying the webpage, the first response instructing the client device to display the first module data associated with the first subset of the set of webpage modules in the webpage, and transmit, to the client device based on transmitting the first response, a second response including the token identifying the webpage and second module data associated with a second subset of the set of webpage modules that differs from the first subset of the set of webpage modules.

Some examples of the method, apparatuses, and non-transitory computer-readable medium described herein may further include operations, features, means, or instructions for receiving, from the client device, a second call including the token identifying the webpage and requesting the second module data associated with the second subset of the set of webpage modules, where the second response may be transmitted based on receiving the second request.

Some examples of the method, apparatuses, and non-transitory computer-readable medium described herein may further include operations, features, means, or instructions for generating the token identifying the webpage based on receiving the first call, where transmitting the first response, transmitting the second response, or both, may be based on generating the token identifying the webpage.

Some examples of the method, apparatuses, and non-transitory computer-readable medium described herein may further include operations, features, means, or instructions for transmitting, in the second response, an instruction for the client device to display the second module data associated with the second subset of the set of webpage modules in the webpage.

Some examples of the method, apparatuses, and non-transitory computer-readable medium described herein may further include operations, features, means, or instructions for identifying that the first module data may be to be displayed by the client device prior to the second module data, and categorizing the set of webpage modules into the first subset and the second subset based on identifying that the first module data may be to be displayed by the client device prior to the second module data, where the first response may be transmitted prior to the second response based on the categorizing.

Some examples of the method, apparatuses, and non-transitory computer-readable medium described herein may further include operations, features, means, or instructions for identifying one or more payload sizes, one or more retrieval durations, or both, associated with one or more webpage modules of the set of webpage modules, and categorizing the set of webpage modules into the first subset and the second subset based on the one or more identified payload sizes, the one or more retrieval durations, or both.

Some examples of the method, apparatuses, and non-transitory computer-readable medium described herein may further include operations, features, means, or instructions for identifying historical data associated with a set of calls received from the client device, and categorizing the set of webpage modules into the first subset and the second subset based on the historical data.

Some examples of the method, apparatuses, and non-transitory computer-readable medium described herein may further include operations, features, means, or instructions for identifying one or more webpage viewing durations associated with the set of calls received from the client device, where categorizing the set of webpage modules into the first subset and the second subset may be based on the one or more webpage viewing durations.

Some examples of the method, apparatuses, and non-transitory computer-readable medium described herein may further include operations, features, means, or instructions for receiving, from one or more client devices, a set of requests for module data associated with the set of webpage modules for presentation in the webpage, and categorizing the set of webpage modules into the first subset and the second subset based on a machine learning model trained using the set of requests.

Some examples of the method, apparatuses, and non-transitory computer-readable medium described herein may further include operations, features, means, or instructions for transmitting, to one or more worker servers based on receiving the first request, an indication of the second subset of set of modules and an instruction to obtain the second module data associated with the second subset of the set of webpage modules, where the second response may be based on transmitting the indication of the second subset of webpage modules to the one or more worker servers.

DETAILED DESCRIPTION

Figure 1:
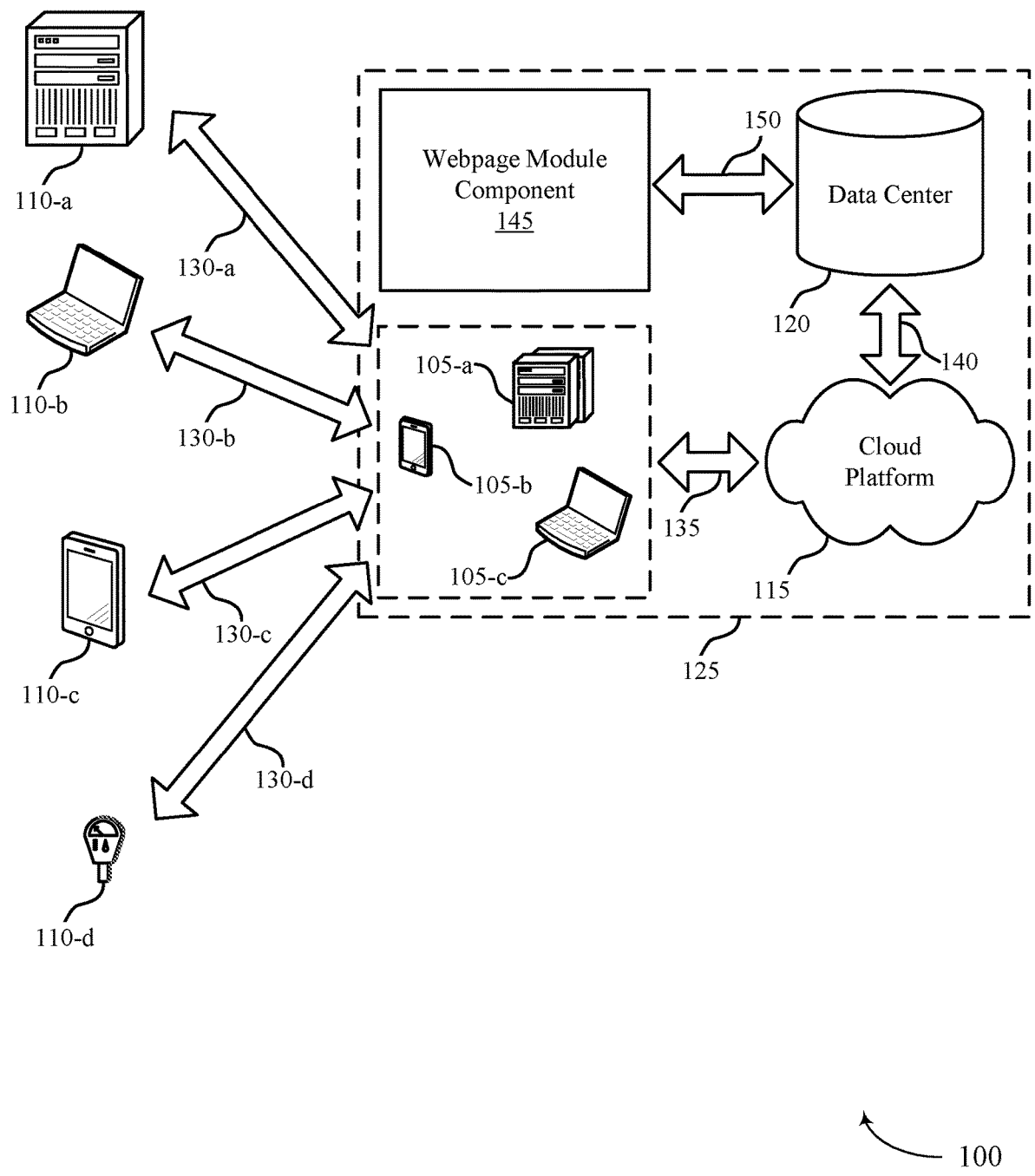
FIG. 1 illustrates an example of a system for webpage call processing that supports multi request asynchronous delegation for enhanced performance in accordance with aspects of the present disclosure.

In some networked systems, a client device may send a request, or a call, when attempting to access a webpage. The call may identify one or more webpage modules that correspond to data, pictures, search results, and other information of the webpage. A server may receive the call, retrieve module data corresponding to the identified modules, and may return a response to the client device that includes the webpage module data. Each webpage module may be responsible for generating a subset of the information which is provided to the client device for presentation within the webpage. For the purposes of the present disclosure, the term "webpage module" may be used to refer to packages of code (e.g., Hypertext Markup Language (HTML) code, JavaScript code, cascading style sheets (CSS) code, etc.) which may be used to generate, retrieve, or render portions of a webpage.

For example, in the context of a webpage for an online marketplace, a server may receive a search query (e.g., call) for a product listed on the online marketplace from a client device and may return search results which may be displayed within the webpage via a graphical user interface (GUI) of the client device. In an example, a first webpage module associated with the webpage may retrieve one or more pictures for search results to present within the webpage, a second webpage module may retrieve one or more product descriptions for the search results, a third webpage module may retrieve product reviews for the search results, and the like. In this regard, a webpage may be associated with a set of webpage modules, where each respective webpage module is used to retrieve data associated with various portions of the webpage.

In some conventional systems, the server may place a large burden on the client device to preload data and resources associated with the webpage. Additionally, according to some techniques, the server may delegate large quantities of preprocessing to the client device, which places a large processing burden on the client device and may delay presentation of the webpage data. Furthermore, in some other conventional systems, the server may not respond to the call until it has collected all of the module data for each of the different requested webpage modules. In some cases, the server may incur extensive delay retrieving module data for some webpage modules as compared to other webpage modules. These delays attributable to a subset of webpage modules may result in a bottleneck on the server side, thereby delaying the transmission of module data to the client device. Such delays may result in diminished user experience, as well as result in extra data charges for client devices associated with paid data connections.

Accordingly, to enable improved call processing, techniques are described for returning server responses to a call (e.g., request) received from a client device in two or more responses. For the purposes of the present disclosure, the terms "call," "request," and like terms, may be used interchangeably to refer to a signal, message, or other transmission which requests data associated with one or more webpages. In some implementations, each response returned by the server may be associated with a token which the client device may use to associate the responses with the webpage modules for the same webpage. Subsequent calls associated with the same webpage may additionally include the token. By passing a token back and forth via calls and responses associated with a webpage, user context and other data may be preserved, which may enable faster and more efficient call processing, thereby expediting the return of webpage module to the client device.

In an example, a server may receive a first call (e.g., first request) associated with a webpage from a client device. In some cases, the webpage may be associated with a set of webpage modules which return various portions of the webpage data. In this example, the server may return a first response that includes module data for a first subset of webpage modules. The first response and the second response may include a token associated with the webpage and the requested modules. Upon receiving the first response, the client device may display the data associated with the first response in the webpage displayed on a user interface (e.g., GUI) of the client device. In some cases, the client device may include the token in a second call (e.g., second request) for data associated with a webpage module included within the second subset of webpage modules. In some implementations, the server may return the second response including the token in response to receiving the second call, where the second response includes module data for the second subset of modules. The client device may then use the token to associate the second response, along with the module data for the second subset of modules, with the webpage, and may thereby display the data included within the second response on the user interface of the client device.

In some implementations, a server may be configured to categorize a set of webpage modules associated with a webpage into two or more subsets, where each subset of webpage modules may be associated with a response returned by the server. For example, upon receiving a first call associated with a webpage from a client device, a server may be configured to categorize a set of webpage modules associated with the webpage into a first subset of webpage modules and a second subset of webpage modules. In this example, the server may generate and/or retrieve the module data associated with the first subset of webpage modules, and may delegate the second subset of webpage modules to one or more worker servers. In this regard, the server may be configured to return a first response to the client device generated via the first subset of webpage modules while the one or more worker servers generate and store (e.g., cache) module data associated with the second subset of webpage modules. In some aspects, the server and the one or more worker servers may retrieve the module data associated with the first and second subset of webpage modules, respectively, in parallel (e.g., concurrently). Subsequently, the server may quickly retrieve the module data generated/retrieved by the second subset of webpage modules in response to a second call from the client device and/or upon determining that the one or more worker servers have stored the module data associated with the second subset of webpage modules in cache.

In some aspects, a server may be configured to categorize webpage modules into the two or more subsets of webpage modules based on a quantity of parameters. Parameters which may be used to categorize the webpage modules into the respective subsets may include characteristics associated with the first and/or second call, an order in which module data is to be presented within the webpage at the client device, durations associated with retrieving the respective webpage modules (e.g., how long it will take the server to retrieve each webpage module when responding to a call), payload sizes associated with the module data of each respective module, historical data associated with the client device, or any combination thereof. For example, the server may be configured to determine an order in which module data is to be displayed at the client device in response to the calls, and may categorize webpage modules which generate module data that is to be displayed first into the first subset of webpage modules. For instance, when responding to a query (e.g., call) for a product listed on an online marketplace, the server may determine a first webpage module associated with a title of the product and a second webpage module associated with a picture for the product are to be displayed at the client device first. In this example, the server may categorize the first and second webpage modules into a first subset of webpage which will be associated with a first response returned by the server. By way of another example, the server may be configured to categorize webpage modules with shorter retrieval times and/or smaller payloads into the first subset of webpage modules in order to reduce a time to first byte (TTFB) for module data delivered to the client device.

In some implementations, machine learning techniques may be used to categorize webpage modules into the respective subsets and return responses to client devices. In particular, a server may be configured to train a machine learning model based on calls received from client devices, historical call data, and the like, and may be configured to categorize webpage modules into the respective subsets of webpage modules using the machine learning model. For example, if users (e.g., client devices) frequently transmit a first call for a product and subsequently select "product reviews" (e.g., a second call for "product reviews") shortly after the product is displayed, a machine learning model trained using the received calls may be configured to categorize a webpage module associated with "product reviews" in the first subset of webpage modules such that the product review information may be quickly returned to the client device within the first response from the server. Moreover, machine learning models may be tailored for specific clients, types of client devices (e.g., mobile client devices, desktop client devices), geographic locations of client devices, and the like. For example, a machine learning model may be trained on a client device basis, such that each client device may be associated with an individualized machine learning model which is specific to each particular client device.

In some aspects, the described systems and methods may utilize a token to enable the client device and the server to associate calls from the client device and responses returned by the server with the respective webpage. The token may be passed back and forth between the server and the client device to enable both the server and client device to quickly determine that subsequent calls from the client device and/or subsequent responses from the server are associated with the webpage and the first call received. For example, upon receiving a call associated with a webpage, the server may generate a token associated with the webpage, and may transmit the token to the user device along with the first response. Subsequently, the client device may transmit the token to the server along with a second call associated with the first call so that the server may quickly identify and retrieve module data associated with first and/or second calls which have been cached by worker servers. In this regard, exchange of the token between the server and the client device may enable the server to store and quickly identify the context of the client device and cached module data, which may thereby expedite the retrieval of cached module data in response to subsequent calls.

Aspects of the disclosure are initially described in the context of environments supporting an on-demand database service for processing webpage calls. Additional aspects of the disclosure are described in the context of an application flow and a process flow. Aspects of the disclosure are further illustrated by and described with reference to apparatus diagrams, system diagrams, and flowcharts that relate to multi request asynchronous delegation for enhanced performance.

FIG. 1 illustrates an example of a system 100 for cloud computing that supports multi request asynchronous delegation for enhanced performance in accordance with various aspects of the present disclosure. The system 100 includes cloud clients 105, client devices 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple client devices 110. The interactions 130 may include communications, opportunities, purchases, sales, or any other interaction between a cloud client 105 and a client device 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

The client devices 110 may interact with the cloud client 105 over a network connection via interactions 130. The network may implement transfer control protocol and internet protocol (TCP/IP), such as the Internet, or may implement other network protocols. The network connection (e.g., interactions 130) may facilitate transport of data via email, web, text messages, mail, or any other appropriate form of interaction (e.g., interactions 130-a, 130-b, 130-c, and 130-d) via a computer network. In an example, the client device 110 may include a computing device such as a smartphone (e.g., client device 110-a), a laptop (e.g., client device 110-b), a server (e.g., client device 110-c), or a sensor (e.g., client device 110-d). In other cases, the client device 110 may include another computing system. In some cases, the client device 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support customer relationship management (CRM) solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a client device 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a client device 110 and the cloud client 105. Data center 120 may utilize multiple redundancies for security purposes. In some cases, the data stored at data center 120 may be backed up by copies of the data at a different data center (not pictured).

Server system 125 may include cloud clients 105, cloud platform 115, and data center 120 that may coordinate with cloud platform 115 and data center 120 to implement an online marketplace. In some cases, data processing may occur at any of the components of the server system 125, or at a combination of these components. In some cases, the servers may perform data processing. The servers may include a cloud client 105 or located at data center.

In this aspects, the system 100 may be configured to receive calls from client devices 110 for webpage data, process the calls, and return responses to the client devices 110 including the webpage data. According to techniques described herein, the system 100 may include a webpage module component 145 which is configured to return server responses to a call received from a client device 110 in two or more responses associated with two or more subsets of webpage modules. The webpage module component 145 may communicate with cloud platform 115 via connection 155 and may also communicate with data center 120 via connection 150. The webpage module component 145 may receive signals and inputs from client device 110 via cloud clients 105 and via cloud platform 115 or data center 120. In some aspects, the webpage module component 145 may include one or more servers.

As noted previously herein, in some conventional networked systems, a server may receive a call from a client device for a webpage, retrieve module data corresponding to the webpage modules associated with the webpage, and return a response to the client device that includes the webpage module data. In some conventional systems, the server may place a large burden on the client device to preload data and resources associated with the webpage. Additionally, according to some techniques, the server may delegate large quantities of preprocessing to the client device, which places a large processing burden on the client device and may delay presentation of the webpage data.

Additionally, in some other conventional systems, the server may not respond to the call until it has collected all of the module data for each of the different requested webpage modules. In some cases, the server may incur extensive delay retrieving module data for some webpage modules as compared to other webpage modules. These delays attributable to a subset of webpage modules may result in a bottleneck on the server side, thereby delaying the transmission of module data to the client device. Such delays may result in diminished user experience, as well as result in extra data charges for client devices associated with paid data connections. Additionally, returning one large server response including all module data for the webpage may include a large payload which is unable to be efficiently processed at the client device. Such large payloads may thereby consume and overwhelm processing resources at the client device, which further affects speed and performance. Furthermore, delivering excessively large payloads of module data to a client device may result in wasted bandwidth at the client device if the full payload of all webpage modules is not immediately usable, which may lead to unnecessary data charges for client deices which operate according to paid data connections.

Accordingly, the system 100 illustrated in FIG. 1 may support techniques for improved call processing. In particular, the system 100 may be configured to return server responses to a call received from a client device 110 in two or more responses. For example, the server system 125 (e.g., webpage module component 145) of the system 100 may receive a first call associated with a webpage from a client device 110. In some cases, the webpage may be associated with a set of webpage modules which return various portions of the webpage data. In particular, webpage modules may be configured to retrieve data which may be retrieved from databases or servers (e.g., retrieved via the Internet), generated by third-party service providers, generated via calculations or algorithms, and the like.

In this example, the server system 125 may return a first response that includes module data for a first subset of webpage modules. The first response and the second response may include a token associated with the webpage and the requested modules. Upon receiving the first response, the client device 110 may display the data associated with the first response in the webpage displayed on a user interface (e.g., GUI) of the client device 110. In some cases, the client device 110 may include the token in a second call for data associated with a webpage module included within the second subset of webpage modules. In some implementations, the server system 125 (e.g., webpage module component 145) may return the second response including the token in response to receiving the second call, where the second response includes module data for the second subset of modules. The client device 110 may then use the token to associate the second response, along with the module data for the second subset of modules, with the webpage, and may thereby display the data included within the second response on the user interface of the client device 110.

In some implementations, the webpage module component 145 of the server system 124 may be configured to categorize a set of webpage modules associated with a webpage into two or more subsets, where each subset of webpage modules may be associated with a response returned by the server system 125. For example, upon receiving a first call associated with a webpage from a client device 110, the webpage module component 145 may be configured to categorize a set of webpage modules associated with the webpage into a first subset of webpage modules and a second subset of webpage modules. In this example, the webpage module component 145 may generate and/or retrieve the module data associated with the first subset of webpage modules, and may delegate the second subset of webpage modules to one or more worker servers (e.g., additional servers within the server system 125). In this regard, the webpage module component 145 of the server system 125 may be configured to return a first response to the client device 110 generated via the first subset of webpage modules while the one or more worker servers generate and store (e.g., cache) module data associated with the second subset of webpage modules. In some aspects, the webpage module component 145 and the one or more worker servers of the server system 125 may retrieve the module data associated with the first and second subset of webpage modules, respectively, in parallel (e.g., concurrently). Subsequently, the server system 125 may quickly retrieve the module data generated/retrieved by the second subset of webpage modules in response to a second call from the client device 110 and/or upon determining that the one or more worker servers have stored the module data associated with the second subset of webpage modules in cache (e.g., in data center 120).

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
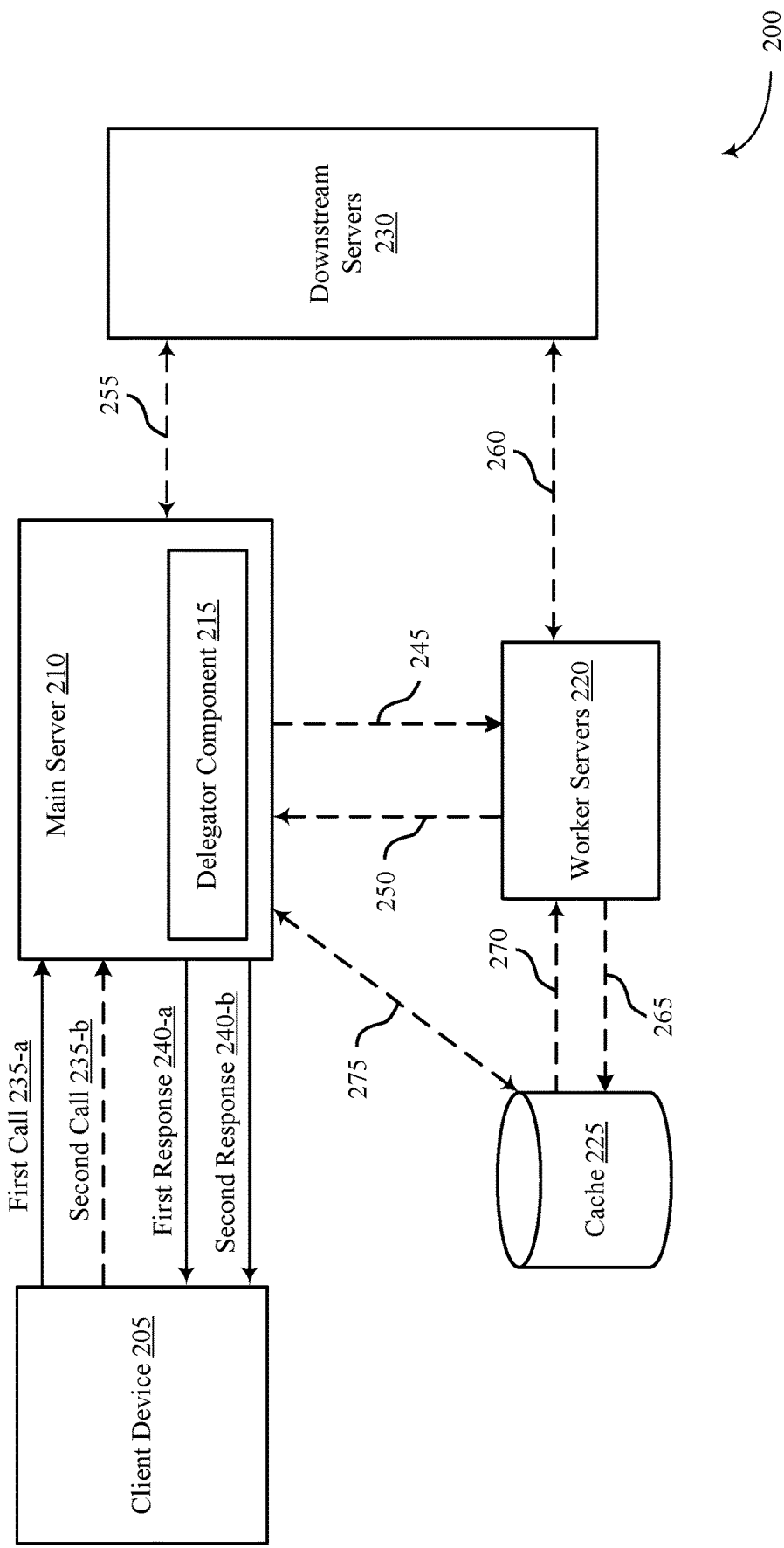
FIG. 2 illustrates an example of a system for webpage call processing that supports multi request asynchronous delegation for enhanced performance in accordance with aspects of the present disclosure.

FIG. 2 illustrates an example of a system 200 for webpage call processing that supports multi request asynchronous delegation for enhanced performance in accordance with aspects of the present disclosure. Components of system 200 may include components (or examples of components) of the system 100, as described with reference to FIG. 1. In this regard, the system 200 may implement, or be implemented by, system 100 in order to enable improved webpage call processing. In particular, the components of the system 200 may be used to receive and process calls from client devices for webpage data, such as calls or queries for products listed on an online marketplace.

The system 200 may include, but is not limited to, a client device 205, a main server 210, worker servers 220, cache 225, and downstream servers 230. The client device 205 illustrated in FIG. 2 may include an example of the client devices 110 illustrated in FIG. 1. Similarly, the main server 210, worker servers 220, cache 225, and/or downstream servers 230 may include examples of components of the server system 125 illustrated in FIG. 1. For example, the main server 210 and cache 225 illustrated in FIG. 2 may be examples of the webpage module component 145 and the data center 120, respectively, as illustrated in FIG. 1. Similarly the worker servers 220, the downstream servers 230, or both, may be examples of other servers or components supported by (or included within) the server system 125 illustrated in FIG. 1.

In some aspects, the system 200 may support techniques for returning server responses to a call 235 for a webpage received from the client device 205 via two or more responses 240. In particular, the system 200 may be configured to categorize webpage modules associated with a webpage indicated by a call into two or more subsets of webpage modules, where each of the two or more subsets of webpage modules are associated with a respective server response 240 which is returned to the client device 205. In some aspects, the webpage modules may be categorized into the respective subsets based on a number of parameters, and may be categorized according to machine learning techniques. By responding to a call 235 for a webpage via two or more server responses generated by respective subsets of webpage modules, the system 200 may enable more efficient call processing, may reduce a TTFB for webpage data returned to the client device 205, and may improve overall user experience.

For example, the main server 210 may receive a first call 235-*a* from the client device 205. The first call 235-*a* may be associated with a webpage, and may include a request for module data associated with a set of webpage modules of the webpage. For example, the first call 235-*a* may include a query for a product listing of an online marketplace. In some aspects, each webpage may be associated with a set of webpage modules, where each webpage module retrieves a subset of webpage data that is to be displayed on the webpage. In particular, webpage modules may be configured to retrieve data which may be retrieved from databases or servers (e.g., retrieved via the Internet), generated by third-party service providers, generated via calculations or algorithms, and the like.

For example, a webpage for a product listing included in an online marketplace may include a first webpage module which retrieves the title for the product listing, a second webpage module which retrieves the description for the product listing, and a third webpage module which retrieves images or videos for the product listing. A single webpage may include any quantity of webpage modules. In this regard, the first call 235-*a* may request module data for presentation in the webpage at the client device 205.

In some aspects, the first call 235-*a* may include an indication of a user context for the request. As it is used herein, the term "user context" may refer to a set of features or characteristics of a call 235, the client device 205 transmitting the call 235, and/or a webpage requested by the call 235 which may affect the content and/or format of server responses returned in response to the call 235. Characteristics/parameters associated with a user context for a call 235 may include, but are not limited to, an identifier of the client device 205 (e.g., Internet Protocol (IP) address, media access control (MAC) address), a time that the first call 235-*a* was received, a session identifier associated with a viewing session in which the first call 235-*a* was received, characteristics or preferences associated with a user or profile of the client device 205 (e.g., user name, online marketplace account number), a network type on which the client device is operating, a device type of the client device 205 (e.g., smartphone, tablet, desktop, smart watch), a geographical location of the client device (e.g., country, region, or state in which the client device 205 is located), or any combination thereof.

In some aspects, indications of the user context within the first call 235-*a* may indicate, to the main server 210, a form, layout, format, or other configuration in which server responses 240 are to be returned. For example, data returned for a webpage may exhibit different formats or layouts depending on if the webpage is to be viewed on a smartphone or a desktop computer. By way of another example, a webpage may exhibit different formats and may include different information (e.g., different languages) depending on which country the webpage is to be viewed. Accordingly, indications of the user context included within the first call 235-*a* may be used by the main server 210 to return webpage data which is appropriate and compatible with the client device 205.

Upon receiving the first call 235-*a*, the main server 210 may generate a token identifying the webpage indicated by the first call 235-*a*. In some aspects, the main server 210 may generate the token based on receiving the first call 235-*a*. In some aspects, the main server 210 may be configured to generate the token in order to identify the webpage associated with the first call 235-*a* and preserve the original user context of the first call 235-*a*. In this regard, the main server 210 may generate the token based on indications of the user context included within the first call 235-*a*. Thus, the token may include any data object or identifier which includes information identifying the webpage associated with the first call 235-*a*, identifying characteristics of the first call 235-*a*, identifying characteristics of the client device 205, or any combination thereof.

By preserving the user context of the first call 235-*a*, the token may be passed back and forth between the main server 210 and the client device 205 in order to help both the client device 205 and the main server 210 to determine that subsequent calls 235 and/or subsequent server responses 240 are related to the webpage, related to one another, or both. Moreover, by generating the token which indicates or preserves the original user context of the first call 235-*a*, the main server 410 may be able to quickly and efficiently identify the original user context of the first call 235-*a* upon receiving subsequent calls 235 (e.g., second call 235-*b*), which may expedite the retrieval of subsequent server responses 240.

In some aspects, the main server 210 may be configured to generate the token based on a number of characteristics or parameters associated with the client device 205, the first call 235-*a* itself, the webpage associated with the first call 235-*a*, or any combination thereof. In some cases, the main server 210 may generate the token using the one or more identifiers of the user context included within the first call 235-*a*. For example, characteristics/parameters which may be used to generate the token may include, but are not limited to, an identifier of the first client device (e.g., IP address, MAC address), a time that the first call 235-*a* was received, a session identifier associated with a viewing session in which the first call 235-*a* was received, characteristics or preferences associated with a user or profile of the client device 205 (e.g., user name, online marketplace account number), a network type on which the client device is operating, a device type of the client device 205 (e.g., smartphone, tablet, desktop, smart watch), a geographical location of the client device (e.g., country, region, or state in which the client device 205 is located), or any combination thereof. By way of another example, the token may be generated as a hashing function of one or more inputs, values, or parameters. In some aspects, the token generated by the main server 210 may include identifiers of the characteristics or parameters on which the token is based.

For example, a webpage of an online marketplace may have a different appearance and/or include different information depending on the geographical position of the client device accessing the webpage. For instance, a webpage of an online marketplace may look different if the webpage is accessed in the United States as it would if the webpage were accessed in Australia. Furthermore, the layout, data, orientation, and overall appearance of the webpage may vary depending on whether the webpage is being assessed via a desktop computer or via a smartphone. In this regard, according to some conventional techniques, a server may have to determine a user context for each call 235 that is received (e.g., determine a location of the client device, determine a type of the client device) in order to determine the correct data, appearance, format, layout, and other characteristics of the webpage which is being accessed. According to some conventional techniques, a server may be required to determine the user context for each and every call that is received, which may require processing resources and delay the return of server responses, as will be discussed in further detail herein.

Comparatively, by generating the token including identifiers of the user context of the first call 235-*a*, techniques described herein may preserve the original context of the first call 235-*a*, and may speed up the generation of subsequent server responses. For example, the token generated at 435 may indicate that the client device 205 includes a smartphone, and may indicate a geographical position of the client device 205. The token may then be passed back and forth between the client device 205 and the main server 210 via subsequent server responses 240 and subsequent calls 235 in order to preserve the original user context of the first call 235-*a*. In this regard, upon receiving subsequent calls 235 (e.g., second call 235-*b*) from the client device 205 which include the token, the main server 210 may be able to quickly determine the original user context of the first call 235-*a* (e.g., quickly determine the device type and location of the client device 205), which may enable the main server 210 to process and return subsequent server responses in a faster and more efficient manner.

In some aspects, the main server 210 may identify one or more categorization parameters for the webpage requested by the first call 235-*a*. In some aspects, the main server 210 may identify the one or more categorization parameters based on receiving the first call 235-*a*, generating the token, or both. The one or more categorization parameters may include any parameters or characteristics which may be used to categorize the set of webpage modules associated with the webpage requested by the first call 235-*a* into two or more subsets of webpage modules.

In particular, the categorization parameters may include characteristics/parameters associated with the data generated or retrieved by each respective webpage module, characteristics/parameters associated with the client device 205 or other client devices transmitting calls 235 to the main server 210, characteristics/parameters associated with the users performing the calls 235 (e.g., users operating the client devices 205), or any combination thereof. For example, the categorization parameters may include, but are not limited to, a relative order (e.g., relative priority) in which module data is to be displayed in the webpage, payload sizes of the respective webpage modules, retrieval durations for the respective modules, historical data (e.g., viewing history) of the client device 205, viewing durations of module data of the webpages, or any combination thereof.

For example, upon receiving the first call 235-*a* for the webpage, the main server 210 may determine that first module data generated by a first webpage module of the webpage is to be displayed prior to second module data generated by a second webpage module of the webpage (e.g., first module data has a higher priority than the second module data). For instance, the main server 210 may determine that a title of a product listing generated by a first webpage module is to be displayed before (e.g., has a higher priority than) a set of reviews generated by a second webpage module. In these examples, the relative orders in which the module data is to be displayed (e.g., relative priorities) may include categorization parameters which may be later used to categorize the webpage modules of the webpage.

By way of another example, payload sizes of each respective webpage module and/or retrieval durations of each respective webpage module may also include categorization parameters which may be later used to categorize the webpage modules of the webpage. Historical data (e.g., viewing history) of the client device 205 and/or other client devices may include an additional categorization parameters which may be later used to categorize the webpage modules of the webpage. For example, the first call 235-*a* may include a request for a product listing on an online marketplace. In this example, the main server 210 may reference historical data (e.g., viewing history, call history) of the client device 205 (which may be stored in cache 225) in order to determine that the client device 205 frequently selects a "view customer reviews" button (e.g., makes a subsequent call 235 for customer reviews) after a product listing webpage is first displayed. In this example, the historical data indicating that the client device 205 frequently makes subsequent calls 235 for customer reviews may include a categorization parameter which may be later used to categorize the webpage modules of the webpage.

The main server 210 may categorize the set of webpage modules of the webpage requested by the first call 235-*a* into two or more subsets of webpage modules. In some aspects, the main server 210 may categorize the set of webpage modules based on the one or more identified categorization parameters. As noted previously herein, each subset of webpage modules may be used to generate a respective server response 240 which is returned to the client device 205. In this regard, the main server 210 may categorize the set of webpage modules of the webpage based on a relative order in which module data is to be returned to the client device 205. For example, a first subset of webpage modules may be used to generate a first response 240-*a* which is returned to the client device 205, and a second subset of webpage modules may be used to generate a second response 240-*b* subsequent to the first response 240-*a*. Moreover, additional subsets of webpage modules (e.g., third subset of webpage modules, fourth subset of webpage modules) may be used to generate additional server responses 240 that are transmitted to the client device 205.

For example, upon receiving the first call 235-*a* for a webpage, the main server 210 may identify that first module data (e.g., title of a product listing) generated by a first webpage module of the webpage is to be displayed prior to second module data (e.g., shipping options of a product listing) generated by a second webpage module of the webpage. In other words, the main server 210 may determine that the first module data has a higher priority than the second module data. Some systems may refer to the first module data as data which is "above the fold," and the second module data as data which is "below the fold." In this example, the main server 210 may categorize the set of webpage modules of the webpage into a first subset and a second subset based on identifying that the first module data is to be displayed prior to the second module data. In particular, the first webpage module may be categorized into the first subset of webpage modules and the second webpage module may be categorized into the second subset of webpage modules. Accordingly, the first module data (e.g., title of a product listing) may delivered to the client device 205 via the first response 240-a generated by the first subset of webpage modules prior to the second module data (e.g., shipping options of a product listing) which is delivered to the client device 205 via the second response 240-b generated by the second subset of webpage modules.

In this regard, the main server 210 may categorize the webpage modules based on whether or not module data associated with each respective webpage module is executed for a first rendering of the webpage at the client device 205. In other words, webpage modules which generate module data that is used for a first rendering of the webpage may be categorized into the first subset of webpage modules, and webpage modules which do not generate module data that is used for a first rendering of the webpage may be categorized into later subsets of webpage modules (e.g., second subset of webpage modules, third subset of webpage modules).

Categorizing the webpage modules by a relative order or priority in which module data is to be displayed on the webpage may improve user experience by delivering the most important module data first, and may prevent unnecessary processing. For example, a webpage for a product listing may not display available color options for a product unless a user selects a "colors/styles" drop-down menu (e.g., transmits a subsequent call 235 for colors/styles). In other words, the module data for the images and various color options may not be executed for the initial rendering of the webpage, and may only be executed if the data is specifically selected. In this example, the main server 210 may categorize webpage modules associated with the "colors/styles" module data in a second (or later) subset of webpage modules so that this module data is not transmitted to the client device 205 within the first response 240-a. Other data which may not be displayed until subsequent user selections (e.g., subsequent calls 235) are received may include shipping options, tax calculations, shipping cost calculations, bulk savings options, and the like.

Accordingly, by delegating webpage modules which are not executed for the initial rendering of the webpage and/or delegating webpage modules which generate data that will only be displayed in response to subsequent user selections (e.g., subsequent calls), techniques described herein may prevent unnecessary processing, reduce time to deliver server responses to the client device 205, and reduce processing and bandwidth requirements for the client device 205. Similarly, delegating webpage modules which generate/retrieve webpage data which is not frequently accessed or viewed in a later subsets of webpage modules may further reduce processing resources at the main server 210, as well as reduce processing and bandwidth requirements for the client device 205.

By way of another example, upon receiving the first call 235-a for a webpage, the main server 210 may identify a first payload size for a first webpage module of the webpage, and may identify a second payload size for a second webpage module of the webpage. In this example, the main server 210 may identify that the first payload size is larger than the second payload size. The payload sizes may include metrics for a quantity of module data (e.g., quantity of bits, quantity of bytes) which is generated and/or retrieved by each of the respective modules. In this example, the main server 210 may categorize the set of webpage modules of the webpage into a first subset and a second subset based on the identified payload sizes. In particular, the second webpage module may be categorized into the first subset and the first webpage module may be categorized into the second subset such that the second module data is delivered to the client device 205 prior to the second module data. Thus, in this example, the main server 210 may be configured to categorize the webpage modules such that webpage modules with smaller data payloads are processed and delivered to the client device 205 prior to webpage modules with larger data payloads.

By way of another example, upon receiving the first call 235-a for a webpage, the main server 210 may identify a first retrieval duration for a first webpage module of the webpage, and may identify a second retrieval duration for a second webpage module of the webpage. In this example, the main server 210 may identify that the first retrieval duration is longer than the second retrieval duration. The retrieval durations may indicate durations of time that each of the respective webpage modules takes to generate and/or retrieve its respective module data. In this example, the main server 210 may categorize the set of webpage modules of the webpage into a first subset and a second subset based on the identified retrieval durations. In particular, the second webpage module may be categorized into the first subset and the first webpage module may be categorized into the second subset such that the second module data is delivered to the client device 205 prior to the second module data. Thus, in this example, the main server 210 may be configured to categorize the webpage modules such that webpage modules with shorter retrieval durations are processed and delivered to the client device 205 prior to webpage modules with longer retrieval durations.

Categorizing webpage modules such that webpage modules with smaller data payloads and/or shorter retrieval durations are processing and delivered prior webpage modules with larger data payloads and/or longer retrieval durations may improve a speed of server responses 240, reduce a TTFB at the client device 205, and improve overall user experience. Additionally, the categorization of the webpage modules based on data payload sizes may help alleviate network bandwidth (e.g., alleviate how much data is transmitted per server response). Furthermore, the categorization of the webpage modules based on data payload sizes may help alleviate bandwidth and processing limitations at the client device 205 by preventing the client device 205 from becoming overloaded with large amounts of data, thereby enabling the client device 205 to reduce energy consumption, processing resources, and central processing unit (CPU) cycles.

In additional or alternative implementations, the main server 210 may categorize the set of webpage modules based on historical data (e.g., viewing history, historical calls/selections, viewing durations) of the client device 205 and/or user operating the client device 205. For example, as noted previously herein, the first call 235-a may include a request for a product listing on an online marketplace. In this example, the main server 210 may reference historical data associated with the client device 205 to determine that the client device 205 frequently selects a "view customer reviews" button (e.g., makes a subsequent call 235 for customer reviews) after a product listing webpage is displayed based on historical data (e.g., viewing history, call history). In this example, the main server 210 may categorize the set of webpage modules of the webpage into a first subset and a second subset based on the identified historical data. In particular, the webpage module which generates/retrieves the customer reviews data may be categorized into the first subset of webpage modules so that it is delivered to the client device 205 along with a first response 240-*a*. In this example, by delivering the module data for the customer reviews in the first response 240-*a*, techniques described herein may expedite the delivery of customer review data to the client device 205, reduce a quantity of calls 235 that are performed, and prevent unnecessary back-and-forth between the client device 205 and the main server 210 in the event the client device 205 again requests customer review data.

Similarly, the main server 210 may utilize viewing histories of the client device 205 with respect to module data returned in previous calls 235 received from the client device 205 to categorize the set of webpage modules. For example, the main server 210 may determine that the client device 205 has spent large amounts of times viewing bulk savings options during previous calls 235, but has spent minimal time viewing customer reviews. In this example, the main server 210 may determine that a webpage module which generates the data for the bulk savings options has a higher priority than a webpage module which generates the data for the customer reviews. Accordingly, in this example, the main server 210 may categorize the webpage module for the bulk saving options in the first subset and the webpage module for the customer reviews in the second subset so that the data for the bulk savings options is delivered to the client device 205 in the first response 240-*a* prior to the data for the customer reviews.

In this regard, the main server 210 may utilize historical data associated with the client device 205 to tailor an order in which module data is delivered to the client device 205. Moreover, the main server 210 may be configured to categorize webpage modules for each respective client device 205 that is communicatively coupled to the main server 210. For example, the main server 210 may categorize the webpage modules differently for the client device 205 as compared to a second client device (not shown) based on the historical data (e.g., viewing histories) associated with the client device 205 and the second client device, respectively.

Furthermore, configurations for categorizing webpage modules may be used to categorize webpage modules for a variety of demographics of users and/or client devices 205. For example, configurations for categorizing webpage modules may be used to categorize webpage modules for users of specific age groups, genders, geographic locations, users who have expressed interest in certain categories or topics, and the like. For example, the main server 210 may identify that users in the age range of 20 to 30 often make subsequent calls for customer review data once a webpage for a product listing is displayed. Thus, the main server 210 may utilize a categorization configuration for this demographic which categorizes webpage modules which generate consumer review data in the first subset of webpage modules associated with a first response 240-*a*. Subsequently, the main server 210 may receive a call 235 from a user device associated with (e.g., operated by) a 25 year old female. In this example, the main server 210 may determine that the user belongs to the respective demographic (e.g., 20-30 year olds), and may thereby categorize webpage modules for the received call 235 according to the categorization configuration associated with the respective demographic.

In some aspects, the main server 210 may be configured to categorize the set of webpage modules using machine learning techniques. In particular, tracking data associated with the client device 205 and/or other client devices (not shown) may be used to train one or more machine learning models which may subsequently be used to categorize sets of webpage modules in response to calls 235 received from client devices 205. Specifically, main server 210 may be configured to process calls 235 for an online marketplace, and may therefore receive a number of calls 235 from a multitude of client devices 205. The respective calls 235 may be requests for different webpages (e.g., different product listings), and may be received from users with differing interests, backgrounds, ages, genders, geographical locations, and the like. In this regard, the main server 210 may be configured to determine any quantity of parameters or characteristics associated with the received calls 235, the client devices 205 transmitting the calls, or both, in order to train a machine learning model. Parameters which may be used to train the machine learning model may include, but are not limited to, a geographical location of the client devices 205 (e.g., country or region), a network type of the client devices 205, a device type of the client device (e.g., smartphone, tablet, desktop), historical data for each respective client device 205 (e.g., viewing histories), the types of webpages associated with the calls 235 (e.g., the type of product listing such as single-item or multi-item listings, shipping options), use cases associated with each respective call 235, and the like.

Upon generating the machine learning model, the machine learning model may be used to categorize sets of webpage modules for subsequently received calls 235. In particular, the machine learning model may be configured to utilize parameters associated with a subsequent call 235 (e.g., geographical location, historical data, device type) to categorize a set of webpage modules for the call 235. Techniques described herein may utilize machine learning techniques to more efficiently and effectively categorize webpage modules. Additionally, machine learning techniques may be used to tailor how webpage modules are categorized (and therefore tailor an order in which webpage data is delivered to client devices 205) on a client device-by-client device basis, such that each client device 405 may be associated with an individualized machine learning model which is specific to each particular client device 205. Moreover, different machine learning models may be generated for different demographics of users to further tailor webpage responses. For instance, a first machine learning model may be generated for female teenagers, a second machine learning model may be generated for users who have expressed interest in bulk savings options, a third machine learning model may be generated for calls received from smartphones, and a fourth machine learning model may be generated for calls received from desktop computers. Additionally or alternatively, a single machine learning model may be configured to perform categorization for multiple users and/or determined demographics of users.

For example, over the course of time, the main server 210 may receive a first set of calls 235 from a first set of client devices 205 located in Australia, and may receive a second set of calls 235 from a second set of client devices 205 located in the United States. Each of the calls 235 may be associated with various product listings of an online marketplace. The main server 210 may be configured to determine one or more parameters associated with the respective sets of calls 235 and/or the respective sets of client devices 205 (e.g., device types, historical data for the respective client devices 205) to train a machine learning model. The trained machine learning model may then be used to categorize webpage modules for subsequently received calls 235. For instance, it may be the case that users in Australia more often selected shipping options after an initial rendering of a webpage, whereas users in the United States more often selected color/style options after an initial rendering of the webpage.

In this example, upon receiving the first call 235-*a* from the client device 205 located in Australia, the machine learning model may be configured to categorize a webpage module for shipping options in the first subset of webpage modules so that data for shipping options is delivered to the client device 205 via the first response 240-*a*. Conversely, upon receiving the first call 235-*a* from the client device 205 located in the United States, the machine learning model may be configured to categorize a webpage module for color/style options in the first subset of webpage modules so that data for color/style options is delivered to the client device 205 via a first response 240-*a*.

In this regard, the use of machine learning models may result in different categorizations of webpage modules dependent upon the respective characteristics of the calls 235 and/or client devices 205. Specifically, continuing with the same example above, the machine learning model may generate or output different categorization of webpage modules for client devices 205 in Australia as compared to client devices 205 in the United States.

In some aspects, referring to application flow 245, the main server 210 may delegate one or more subsets of webpage modules to the worker servers 220 (e.g., asynchronous delegation). In other words, the main server 210 may transmit an indication of one or more subsets of webpage modules to the worker servers 220 along with an instruction for the worker servers 220 to obtain the module data associated with the one or more subsets of webpage modules. The main server 210 may delegate the one or more subsets of webpage modules via a delegator component 215. The main server 210 may delegate the one or more subsets of webpage modules based on receiving the first call 235-*a*, generating the token, identifying the categorization parameters, categorizing the set of webpage modules into two or more subsets of webpage modules, or any combination thereof.

In some aspects, the main server 210 may delegate every subset of webpage modules to the worker servers 220 except for the first subset of webpage modules. For example, in cases where a set of webpage modules associated with the webpage requested by the first call 235-*a* is categorized into a first subset of webpage modules and a second subset of webpage modules, the main server 210 may transmit an indication of the second subset of webpage modules with an instruction for the worker servers 220 to obtain the second module data associated with the second subset of webpage modules (e.g., delegate the second subset of webpage modules to the worker servers 220). By way of another example, in cases where a set of webpage modules associated with the webpage requested by the first call 235-*a* is categorized into a first subset of webpage modules, a second subset of webpage modules, and a third subset of webpage modules, the main server 210 may transmit an indication of the second and third subsets of webpage modules with an instruction for the worker servers 220 to obtain module data associated with the second and third subsets of webpage modules (e.g., delegate the second and third subsets of webpage modules to the worker servers 220).

In some aspects, the main server 210 may additionally transmit an indication of the token to the worker servers 220 when delegating the one or more subsets of webpage modules at application flow 245. In this regard, the worker servers 220 may be configured to identify the original user context associated with the first call 235-*a* (e.g., geographical location of the client device 205, type of client device (smartphone, tablet, desktop)), and may obtain the module data associated with the delegated subsets of webpage modules based on (e.g., in accordance with) the original user context. For example, the worker servers 220 may be configured to identify that the client device 205 includes a smartphone based on the token, and may therefore generate and/or retrieve the module data associated with the delegated webpage in a format which is compatible with smartphones.

Delegating one or more subsets of webpage modules to the worker server 220 may provide a number of advantages. First, by delegating webpage modules which are not executed/processed for an initial rendering of the webpage at the client device 205 and/or are only executed if subsequent calls 235 are received, the main server 410 may preserve hardware and processing resources to generate/retrieve module data which will be displayed on the webpage first. This may enable the main server 210 to obtain module data associated with the first subset of webpage modules faster, thereby reducing a TTFB of the webpage at the client device 205. Secondly, delegating one or more subsets of webpage modules may enable the worker servers 220 to obtain module data associated with the delegated subsets of webpage modules while a first response 240-*a* is being generated and provided to the client device 205. In this regard, module data associated with webpage modules which were delegated to the worker server 220 may be cached and retrieved quickly without any additional processing in the event additional calls are received from the client device 205. Furthermore, delegating webpage modules which are associated with larger payload sizes and/or longer retrieval durations may further reduce the hardware and processing resources required to return a first response 240-*a* by the main server 210, which further reduces a TTFB at the client device 205.

In some aspects, the main server 210 may process the first subset of webpage modules. In this regard, the main server 210 may generate or retrieve the first module data associated with the first subset of webpage modules. The main server 210 may process the first subset of webpage modules at based on receiving the first call 235-*a*, generating the token, identifying the categorization parameters, categorizing the set of webpage modules into two or more subsets, delegating the one or more subsets of webpage modules, or any combination thereof.

In some cases, the main server 210 may process the first subset of webpage modules in parallel (e.g., concurrently) with the worker server 220 processing the one or more delegated subsets of webpage modules. For example, in cases where the set of webpage modules of the webpage is categorized into a first subset of webpage modules and a second subset of webpage modules, the worker server 220 may process the second subset of webpage modules during at least a portion of time in which the main server 210 processes the first subset of webpage modules. Concurrent processing of the respective sets of webpage modules by the main server 210 and the worker server 220 may enable faster, more efficient processing of webpage calls.

In some aspects, the main server 210 may process the first subset of webpage modules by querying or otherwise leveraging one or more downstream servers 230 at application flow 255. The one or more downstream servers 230 may include servers which maintain online databases, servers associated with third-party service providers, servers which provide calculations or other mathematical algorithms, and the like. For example, in the context of a webpage module which provides shipping information, the main server 210 may reference or query a downstream server 230 operated by a third-party shipping provider in order to retrieve shipping costs for shipping services provided by the third-party shipping provider.

Upon processing the first subset of webpage modules, the main server 210 may transmit a first response 240-*a* to the client device 205. The first response 240-*a* may include the first module data associated with (e.g., generated or retrieved by) the first subset of webpage modules. Moreover, the first response 240-*a* may instruct the client device 205 to display the first module data in the webpage presented on a user interface (e.g., GUI) of the client device 205. In some aspects, the main server 210 may transmit the first response 240-*a* based on receiving the first call 235-*a*, generating the token, identifying the categorization parameters, categorizing the set of webpage modules into two or more subsets of webpage modules, delegating the one or more subsets of webpage modules to the worker servers 220, processing the first subset of webpage modules, or any combination thereof.

In some aspects, the first response 240-*a* may include the token identifying the webpage. Thus, the main server 210 may indicate the original user context associated with the first call 235-*a* via the token included with the first response 240-*a*. In this regard, the client device 205 may be configured to determine that the first response 240-*a* is associated with the first call 235-*a*, the webpage requested by the first call 235-*a*, or both. Preserving the original user context via the token may facilitate fast and efficient rendering of the first response 240-*a* within the webpage displayed at the client device 205.

Upon receiving the first response 240-*a*, the client device 205 may display the first module data included with the first response 240-*a* in the webpage presented on a user interface (e.g., GUI) of the client device 205. In other words, the client device 205 may render the webpage displayed on the user interface of the client device 205 using the first module data included with the first response 240-*a*. In this regard, the client device 205 may display the first module data based on transmitting the first call 235-*a*, receiving the first response 240-*a*, or both.

As noted previously herein, the worker servers 220 may be configured to process the delegated webpage modules in parallel (e.g., concurrently) with the main server 210 processing the first subset of webpage modules. Moreover, the worker server 220 may be configured to process the webpage modules while the client device 205 is working to display the first response 240-*a*. In this regard, techniques described herein may enable the client device 205 to begin processing and displaying the first response 240-*a* at 465 while the worker server 220 is still processing the delegated webpage modules. Moreover, the worker servers 220 may be configured to query or otherwise leverage the downstream servers 230 at application flow 260 in order to process the delegated webpage modules.

In some aspects, at application flow 265, the worker servers 220 may store module data in cache 225. The module data stored in cache 225 may include module data which was generated or retrieved as a result of processing the one or more subsets of webpage modules delegated to the worker servers 220. For example, in cases where the main server 210 transmits an indication of a second subset of webpage modules to the worker servers 220 (e.g., delegates the second subset of webpage modules at application flow 245), the worker servers 220 may store the second module data associated with the second subset of webpage modules in cache 225. In some aspects, the worker servers 220 may store the module data in cache 225 along with the token at application flow 265. Storing the token along with the cached module data may enable the main server 210 to quickly and efficiently identify that the cached data is associated with the respective webpage, the client device 205, the first call 235-*a*, subsequent calls 235, or any combination thereof.

It may be appreciated that techniques described herein may enable the worker servers 220 to process and store webpage data (module data) which may be associated with subsequent calls 235 and/or subsequent server responses 240 before the subsequent calls 235 requesting the delegated webpage data are ever received. For example, the worker servers 220 may process and store module data for shipping options prior to a subsequent call 235 (e.g., second call 235-*b*) requesting shipping options is ever received from the client device 205, which may expedite subsequent responses (e.g., second response 240-*b*) provided by the main server 210.

In some aspects, the main server 210 may receive a second call 235-*b* from the client device 205. In some aspects, the second call 235-*b* may include a request for the second module data associated with the second subset of webpage modules of the webpage. In some cases, the second call 235-*b* may be associated with the same webpage as the first call 235-*a*. For example, the first call 235-*a* may include a query for a webpage of a product listing, and the second call 235-*b* may include a request for customer reviews of the product listing. For instance, the second call 235-*b* may be transmitted in response to the user selecting a "customer reviews" button shown on the webpage of the product listing. In this regard, the client device 205 may transmit the second call 235-*b* based on transmitting the first call 235-*a*, receiving the first response 240-*a*, displaying the first response 240-*a*, or any combination thereof.

In some aspects, the second call 235-*b* may include an indication of the token. In this regard, the second call 235-*b* may indicate the original user context associated with the first call 235-*a*. Thus, by including the token with the second call 235-*b*, the client device 205 may not need to transmit the full user context along with the second call 235-*b*. In other words, inclusion of the token with the second call 235-*b* may negate the need for the client device 205 to indicate other parameters or characteristics for the user context (e.g., geographical location, IP address, type of client device 405) within the second call 235-*b*. Moreover, by including the token with the second call 235-*b*, the main server 210 may be able to quickly and efficiently identify that the second call 235-*b* is associated with the first call 235-*a* and/or the same webpage requested by the first call 235-*a*. Furthermore, the token included within the second call 235-*b* may enable the main server 210 to quickly identify module data stored in cache that is requested by the second call 235-*b*.

In some aspects, the main server 210 may retrieve module data stored in cache 225. In some aspects, the main server 210 may receive module data stored in cache 225 directly from cache 225, indirectly via the worker servers 220, or both. For example, in some cases, the worker servers 220 may retrieve the module data stored in cache 225 via application flow 270, and may provide the module data to the main server 210 via application flow 250. In such cases, the worker servers 220 may retrieve the module data stored in cache 225 in response to a request from the main server 210. In additional or alternative cases, the main server 210 may retrieve the module data stored in cache 225 directly from the cache 225 via the application flow 275.

In some aspects, the main server 210 may retrieve module data stored in cache 225 based on receiving the second call 235-b. For example, in cases where the second call 235-b requests the second module data, the main server 210 may be configured to retrieve the second module data (which was generated/retrieved by the worker server 220) from cache 225. Due to the fact that the second module data has already been generated and retrieved by the worker servers 220, the main server 210 may be able to retrieve the data requested by the second call 235-b almost instantaneously, and with little to no additional processing.

In additional or alternative aspects, the main server 210 may retrieve the second module data without receiving the second call 235-b. For example, in some cases, the main server 210 may identify when the second module data is stored in cache 225 (e.g., based on signaling from the worker server 220) and may retrieve the second module data based on identifying that it has been cached (e.g., without prompting from the second call 235-b).

In some aspects, the main server 210 may retrieve the second module data from cache 225 based on the token indicated in the second call 235-b. In particular, the token may enable the main server 210 to quickly and efficiently identify the user context associated with the first call 235-a, the second call 235-b, or both, which may expedite the retrieval of the second module data. The token may also enable the main server 210 to quickly and efficiently identify the module data requested by the second call 235-b within the cache 225. For example, the main server 210 may identify the token included within the second call 235-b, and may identify module data stored in cache 225 which includes a token matching the token included within the second call 235-b. By preserving the user context associated with the client device 205 and/or the calls 235, techniques described herein may enable the main server 210 to return server responses to the client device 205 much faster as compared to some conventional techniques.

Subsequently, the main server 210 may transmit a second response 240-b to the client device 205. The second response 240-b may include the second module data associated the second subset of webpage modules. Moreover, the second response 240-b may instruct the client device 205 to display the second module data in the webpage presented on the user interface (e.g., GUI) of the client device 205. In some aspects, the main server 210 may transmit the second response 240-b based on receiving the first call 235-a, generating the token, identifying the categorization parameters, categorizing the set of webpage modules into two or more subsets of webpage modules, delegating the one or more subsets of webpage modules to the worker servers 220, processing the first subset of webpage modules, transmitting the first response 240-a, receiving the second call 235-b, retrieving the second module data from cache 225, or any combination thereof.

In some aspects, the second response 240-b may include the token identifying the webpage. Thus, the main server 210 may indicate the user context associated with the first call 235-a and/or the second call 235-b via the token included with the second response 240-b. In this regard, the client device 205 may be configured to determine that the second response 240-b is associated with the first call 235-a, the second call 235-b, the webpage requested by the first and/or second calls 235, or any combination thereof. Preserving the original user context via the token may facilitate fast and efficient rendering of the second response 240-b within the webpage displayed at the client device 205.

Upon receiving the second response 240-b, the client device 205 may display the second module data included with the second response 240-b in the webpage presented on a user interface (e.g., GUI) of the client device 205. In other words, the client device 205 may render the webpage displayed on the user interface of the client device 205 using the second module data included with the second response 240-b. In this regard, the client device 205 may display the second module data based on transmitting the first call 235-a, transmitting the second call 235-b, receiving the second response 240-b, or any combination thereof.

While the system 200 illustrated in FIG. 2 shows and describes two calls 235 being received from the client device 205, it is contemplated herein that the client device 205 may transmit any quantity of calls 235. For example, while viewing a webpage for a product listing, a user may "click" or select to a drop down menu for color/style options, a drop down menu for shipping options, and a button for customer reviews, where each these "clicks" or selections results in a subsequent call 235 transmitted to the main server 210. The main server 210 may then process each of the selections in this chain of calls 235 (e.g., chain of requests or queries) as described in detail herein.

Compared to some conventional networked systems, the techniques described herein may reduce and/or eliminate a quantity of resources which must be preloaded at the client device. In particular, by categorizing webpage modules into two or more subsets, a size of a data payload for each response may be reduced, thereby reducing a quantity of resources which must be preloaded and reducing a "fetch" time on the part of the client device.

Techniques described herein may provide for faster, more efficient processing of webpage calls. In particular, responses to webpage calls received from a client device may be parsed up into two or more server responses, where each server response is associated with a subset of webpage modules of the webpage. By categorizing a set of webpage modules of a webpage into two or more subsets of webpage modules used to generate two or more server responses, techniques described herein may reduce processing resources required at the client device, improve the speed of server responses provided to the client device, and improve overall user experience. Additionally, delegating one or more subsets of webpage modules to a worker server may reduce hardware and processing resources of a main server used to return a first response to the client device, thereby further reducing a TTFB at the client device. Furthermore, by preserving an original user context of a webpage call via a token, processing of subsequent calls and/or subsequent calls by the main server and the client device, respectively, may be reduced, which further improves the speed of server responses in response to webpage calls.

Figure 3:
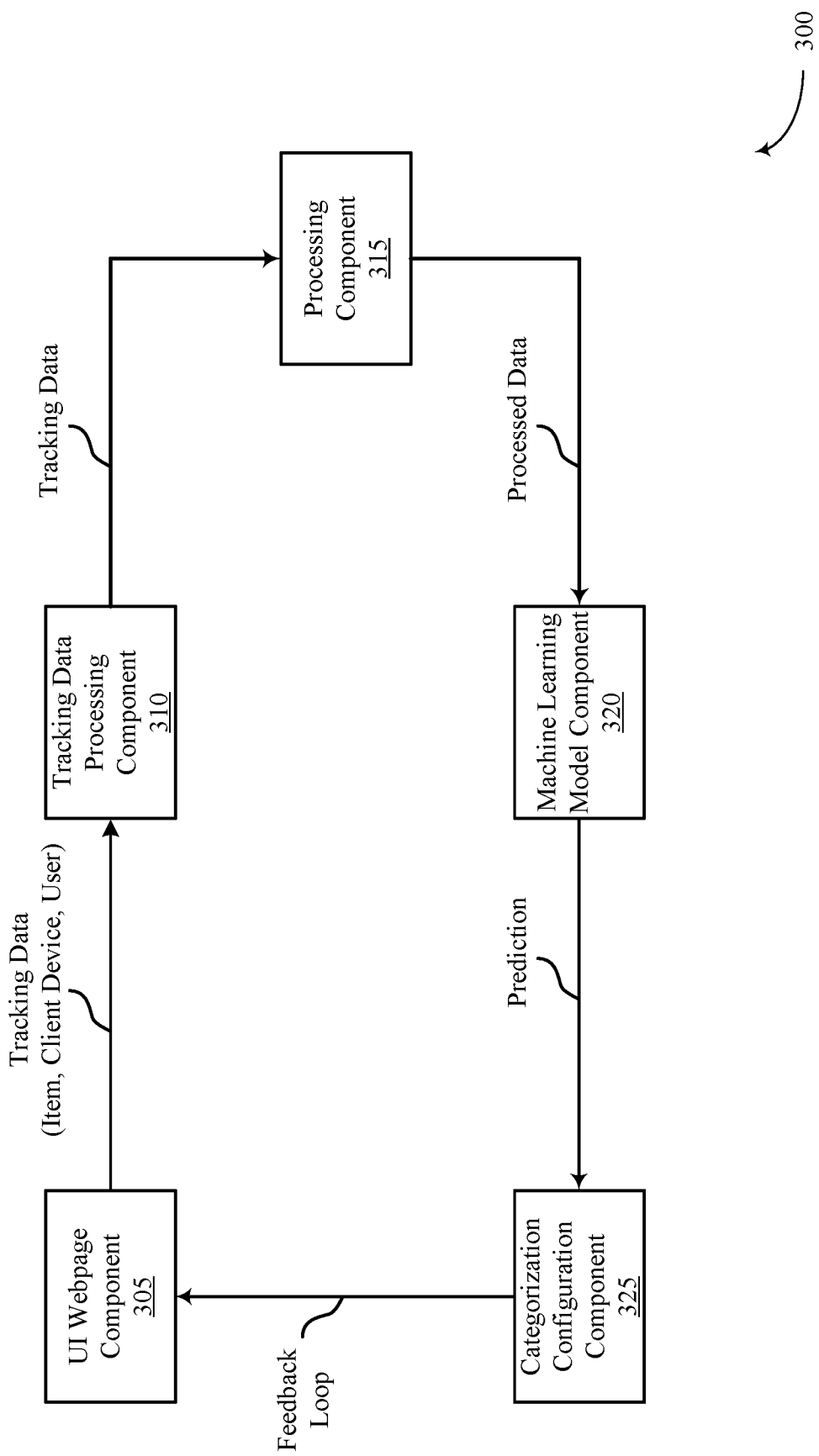
FIG. 3 illustrates an example of an application flow that supports multi request asynchronous delegation for enhanced performance in accordance with aspects of the present disclosure.

FIG. 3 illustrates an example of an application flow 300 that supports multi request asynchronous delegation for enhanced performance in accordance with aspects of the present disclosure. The application flow 300 may implement, or be implemented by, system 100, system 200, or both. In particular, the application flow 300 illustrates the training of machine learning models which may be used to categorize webpage modules. In this regard, the respective modules and components of application flow 300 may be included within or implemented by the server system 125 (e.g., webpage module component) of the system 100, the main server 210 of the system 200, or both. The application flow 300 may include a user interface webpage component 305, a tracking data processing component 310, a processing component 315, a machine learning model component 320, and a categorization configuration component 325.

In some aspects, the user interface webpage component 305 may monitor user interactions of various webpages. For example, the user interface webpage component 305 may monitor webpages for product listings of an online marketplace. In some aspects, the user interface webpage component 305 may generate tracking data based on monitoring the respective webpages. Tracking data may include any interactions between users (e.g., client devices) and the respective webpages. In this regard, tracking data may include any interactions between a user/client device and a webpage including, but not limited to, historical call data (e.g., requests, queries for webpages or portions of webpages), calls (e.g., selections) of buttons or drop-down menus on rendered webpages, viewing durations for given webpages or portions of webpages (e.g., viewing history, viewing durations), information associated with each user/client device (e.g., geographic location, IP address), demographic information (e.g., age, gender, interests), types of client devices, or any combination thereof.

For example, for each user or client device that interacts with an online marketplace (e.g., given client device), the user interface webpage component 305 may identify characteristics or parameters associated with the respective user, including an identifier of the client device (e.g., IP address, MAC address), a name (e.g., username) of the client device or user, a geographic location, demographic information, and the like. The user interface webpage component 305 may additionally identify selections or calls each user makes for webpages, including which product listings each user requests, which portions of generated webpages the user interacts with, which webpages or portions of webpages the user spends time viewing, or any combination thereof. For instance, the user interface webpage component 305 may determine that a given user/client device often transmits calls (e.g., queries) for webpages of product listings for camping equipment, frequently makes subsequent calls for shipping information of the product listings, and spends large amounts of time viewing customer reviews for the product listings.

In some aspects, the user interface webpage component 305 may generate tracking information for the users interacting with the webpages (e.g., interacting with the webpages of the online marketplace). In some aspects, the user interface webpage component may generate a tracking data profile for each respective user and/or client device, where a tracking data profile for each user includes tracking data for that respective user/client device (e.g., name, geographical location, gender, type of client device, viewing history, interests, historical call data).

In some aspects, the tracking data processing component 310 may receive the tracking data (e.g., tracking data profiles) from the user interface webpage component 305. In some aspects, the tracking data processing component 310 may be configured to compile the received tracking data, determine trends within the tracking data, identify organizational groups of users/client devices (e.g., geographical groups, demographic groups), generate sets of related users/client devices, or any combination thereof. For example, the tracking data processing component 310 may be configured to compile the received tracking data into one or more databases. The one or more databases may organize the received tracking data according to the various parameters or characteristics (e.g., name, geographical location, gender, type of client device, viewing history, interests, historical call data, and the like).

In some aspects, the tracking data processing component 310 may organize the tracking data into demographic groups and/or sets of related users. For example, the tracking data processing component 310 may organize tracking data for all users/client devices located in Australia in one geographical group, and may organize tracking data for all users/client devices located in the United States in another geographical group. By way of another example, the tracking data processing component 310 may organize tracking data for all female users in one geographical group, and may organize tracking data for all male users in another demographic group. By way of another example, tracking data processing component 310 may organize tracking data for all smartphone client devices into one organizational group, and may organize tracking data for all desktop computer client devices users in another organizational group.

In some aspects, the tracking data processing component 310 may provide the tracking data to the processing component 315. For example, upon compiling received tracking data into one or more databases and/or organizational groups, the tracking data processing component 310 may provide the tracking data to the processing component 315. In some aspects, the processing component may perform one or more processing operations on the received tracking data. The processing component 315 may include one or more sub-components or modules including, but not limited to, a Kafka pipeline, a Kafka consumer, a Redis component, a pre-processing and cleaning component, a feature selection and extraction component, or any combination thereof.

For example, the processing component 315 may be configured to identify features or trends within the tracking data. For instance, a feature selection and extraction component of the processing component 315 may be configured to determine that users in Australia are more likely to transmit subsequent calls for shipping options after an initial rendering of a webpage for a product listing, whereas users in the United States may be more likely to transmit subsequent calls for color/style options after an initial rendering of a webpage for a product listing.

After processing the received tracking data, the processing component 315 may be configured to transmit processed tracking data to the machine learning model component 320. In some aspects, the machine learning model component may be configured to train one or more machine learning models based on the processed tracking data. The machine learning models trained/generated by the machine learning model component 320 may include, but are not limited to, machine learning classifiers, random forest classifiers, linear/logistic regression models, decision tree models, Naïve Bayes models, and the like.

In some aspects, the machine learning models may be trained in order to enhance one or more criterion associated with generation of server responses in response to calls from client devices. For example, machine learning models may be trained in order to improve a speed at which module data is provided to client devices, reduce payload sizes of server responses delivered to client devices (e.g., tailoring what module data is included within each server response to reduce payload size of each respective server response), improve webpage engagement (e.g., increase time spent on webpage, increase "clicks" or selections on the webpage, Google My Business (GMB) improvement), and the like. Parameters which may be used to train the machine learning models may include any data or parameters included within the processed tracking data including, but not limited to, a geographical location of the client devices (e.g., country or region), a network type of the client devices, a device type of the client devices (e.g., smartphone, tablet, desktop), historical data for each respective client devices (e.g., viewing histories), the types of webpages associated with calls received form the client devices (e.g., the type of product listing such as single-item or multi-item listings, shipping options), use cases associated with each respective call, demographic information associated with each client device/user (e.g., age, gender, interest), and the like.

In some aspects, the machine learning model component 320 may train or generate one or more machine learning models which may be used to categorize sets of webpage modules associated with webpages into one or more subsets of webpage modules. In this regard, the machine learning model component 320 may train or generate one or more machine learning models which may be used to determine a relative order or priority of module data which is to be provided to client devices in response to calls received from the respective client devices.

Upon generating the one or more machine learning models, the machine learning models may be used to categorize sets of webpage modules for subsequently received calls. In this regard, the machine learning models may receive calls as inputs, and generate predictions regarding how webpage modules should be categorized to generate responses for the received calls. In particular, a machine learning model may be configured to utilize parameters associated with a subsequent call (e.g., geographical location, historical data, device type) to categorize a set of webpage modules for the call.

In some aspects, machine learning techniques may be used to tailor how webpage modules are categorized (and therefore tailor an order in which webpage data is delivered to the client device) on a client device-by-client device basis, such that each client device may be associated with an individualized machine learning model which is specific to each particular client device. Moreover, different machine learning models may be generated for different organizational groups (e.g., demographic groups, geographical groups) of users to further tailor webpage responses. For instance, a first machine learning model may be generated for female teenagers, a second machine learning model may be generated for users who have expressed interest in bulk savings options, a third machine learning model may be generated for calls received from smartphones, and a fourth machine learning model may be generated for calls received from desktop computers. Additionally or alternatively, a single machine learning model may be configured to perform categorization for multiple users and/or determined demographics of users.

In some aspects, the machine learning model component 320 may utilize the trained machine learning models to generate predictions (e.g., predictions for how webpage modules are to be categorized) to a categorization configuration component 325. Subsequently, the categorization configuration component 325 may be configured to implement the predictions output from the one or more machine learning models to classify sets of webpage modules into subsets in response to received calls.

For example, a machine learning model may determine that users located in Australia commonly transmit requests for shipping information after being presented a webpage for a product listing. In this regard, upon receiving a first call for a webpage of a product listing, the machine learning model may output a prediction that a webpage module which generates shipping information should be categorized into a first subset of webpage modules such that shipping information is delivered to the client device within a first response returned to the client device. In this example, the machine learning model component 320 may output this prediction to the categorization configuration component 325, and the categorization configuration component 325 may categorize the webpage modules for the webpage requested by the call based on the received prediction (e.g., based on the received prediction for how webpage models are to be categorized).

In some cases, the categorization configuration component 325 may categorize webpage modules in accordance with the predictions received from the machine learning model components 320. In additional or alternative cases, the categorization configuration component 325 may discard, disregard, or otherwise ignore the received prediction. For example, in cases where the categorization configuration component 325 determines a probability that the prediction output by the machine learning model component 320 is incorrect, the categorization configuration component 325 may categorize webpage modules in a manner that is inconsistent with the received prediction.

In some cases, the categorization configuration component 325 may categorize the webpage modules, which may control or adjust data which is displayed on the webpages requested by the users/client devices. For example, the categorizations determined by the categorization configuration component 325 may control or adjust a relative order in which module data is provided to client devices in response to calls. Subsequently, additional calls or interactions received from the client devices in response to generated webpages may be used to further train the machine learning models via the application flow 300.

For example, upon receiving a request from a client device for a product listing via the user interface webpage component 305, the machine learning model component 320 may categorize a webpage module for shipping options in a first subset of webpage modules and a webpage module for customer reviews in a second subset of webpage modules. This categorization (e.g., prediction) of the webpage modules may be passed to the user interface webpage component 305 via a feedback loop, which may display the shipping options for the webpage based on a first response from a main server, and may display the customer review data in a second response (e.g., responsive to a second call) from the main server. In this example, subsequent calls or requests received by the user interface webpage component 305 may be used to generate updated tracking data (e.g., updated training data) which may be used to further train and refine the machine learning model component 320. For instance, the user may not view or otherwise interact with the shipping options returned in the first response, but instead may transmit a second call for the customer review data. In this example, the user interface webpage component 305 may transmit updated tracking data (e.g., updated tracking data which including the absence of interactions for the shipping data, as well as the subsequent call for the customer review data) to the subsequent components of the application flow 300. This updated tracking data may then be fed to the machine learning model component 320, which may update or refine the one or more machine learning models. For instance, training via the updated tracking data may make it more likely that the trained machine learning model with categorize shipping information in a second subset of webpage modules, categorize the customer review data in the first subset of webpage modules, or both.

In this regard, the categorization configuration component 325 may generate a feedback loop, in which webpages rendered according categorizations output from the categorization configuration component 325 are monitored by the user interface webpage component 305 to further train and refine the machine learning models. In other words, upon providing responses to client devices based on the categorizations output from the categorization configuration component 325, the client devices may render webpages based on the received responses, and the user interface webpage component 305 may monitor the rendered webpages to generate tracking data that is used to further refine/train the machine learning models. Accordingly, the application flow 300 may be used to continuously monitor webpages to continuously train machine learning models, which may lead to more efficient and accurate categorizations of webpage modules. In effect, improved categorizations of webpage modules may result in increased speed of server responses, reduction in payload sizes of responses provided to the client devices, and overall improved user experience.

Figure 4:
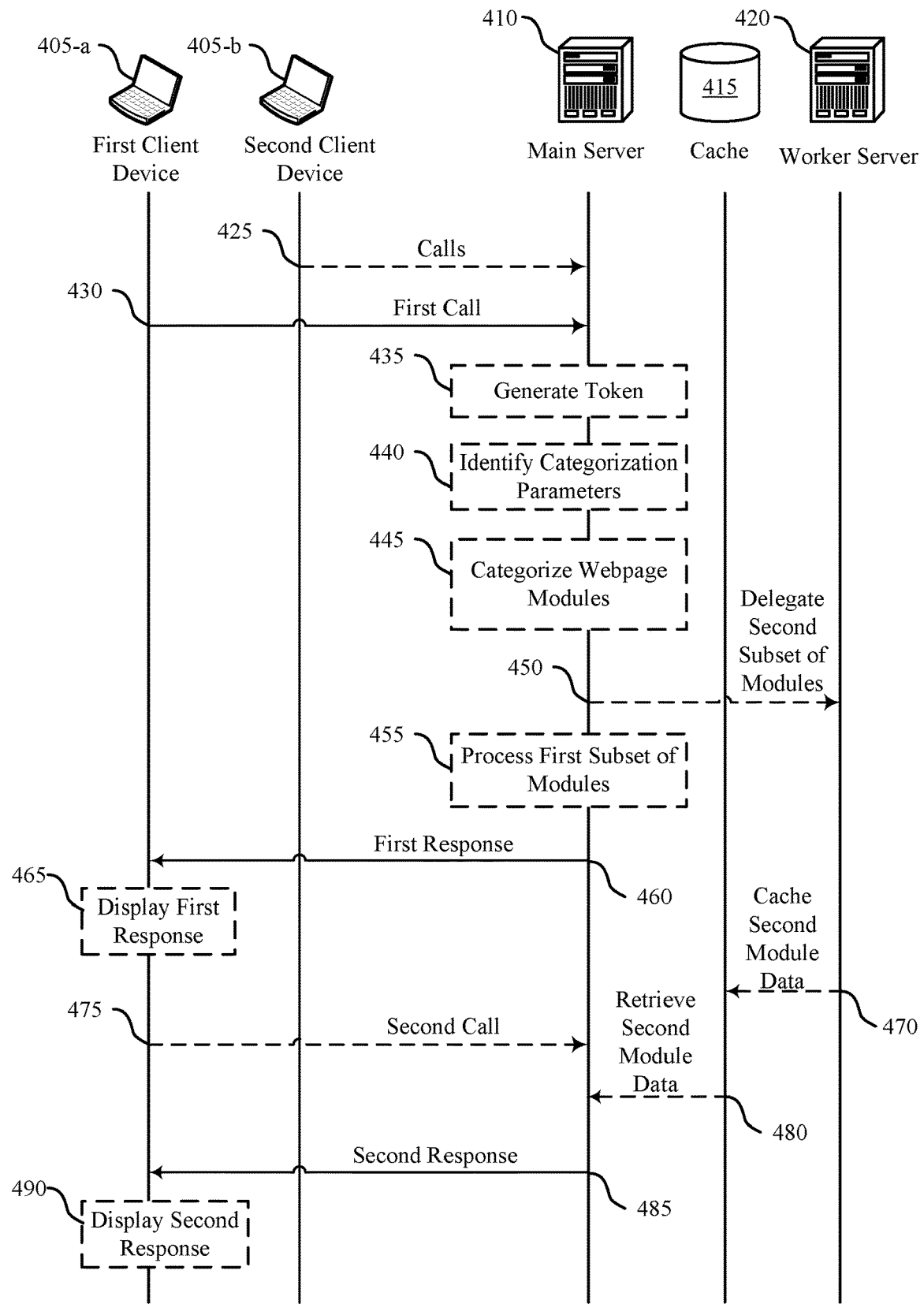
FIG. 4 illustrates an example of a process flow that supports multi request asynchronous delegation for enhanced performance in accordance with aspects of the present disclosure.

FIG. 4 illustrates an example of a process flow 400 that supports multi request asynchronous delegation for enhanced performance in accordance with aspects of the present disclosure. The process flow 400 may implement, or be implemented by, aspects of the system 100, system 200, application flow 300, or any combination thereof. For example, the process flow 400 illustrates a server receiving a call from a client device, categorizing a set of webpage modules associated with the call, and returning two or more server responses to the client device in response to the call.

The process flow 400 may include a first client device 405-a, a second client device 405-b, a main server 410, a cache 415, and a worker server 420, which may be examples of features and components described previously herein with respect to FIGS. 1-3. For example, the first client device 405-a and second client device 405-b may include examples of the client devices 110 and the client device 205 illustrated in FIGS. 1 and 2, respectively. Similarly, the main server 410, cache 415, and worker servers 420 may include examples of the main server 210, cache 225, and worker servers 220 illustrated in FIG. 2. In this regard, the main server 410, cache 415, and worker servers 420 may include examples of components or features included within or implemented by the server system 125 illustrated in FIG. 1.

In the following description of the process flow 400, the operations between the respective components and devices may be performed in different orders or at different times. Certain operations may also be left out of the process flow 400, or other operations may be added to the process flow 400. It is also to be understood that various steps and operations of process flow 400 may be carried out additional or alternative components or devices as those shown and described in FIG. 4.

At 425, the main server 410 may receive one or more calls from one or more client devices 405. For example, as shown in FIG. 4, the main server 410 may receive one or more calls from the second user device 405-b. In some aspects, the one or more calls received at 425 may be associated with one or more webpages. In particular, the one or more calls may be associated with one or more webpages of an online marketplace. In some aspects, each webpage may be associate with a set of webpage modules, where each webpage module retrieves a subset of webpage data that is to be displayed on the webpage. In particular, webpage modules may be configured to retrieve data which may be retrieved from databases or servers (e.g., retrieved via the Internet), generated by third-party service providers, generated via calculations or algorithms, and the like.

At 430, the main server 410 may receive a first call from the first client device 405-a. The first call may be associated with a webpage, and may include a request for module data associated with a set of webpage modules of the webpage. In this regard, the first call may request module data for presentation in the webpage. In some cases, the first call received at 430 may be associated with a same webpage or a different webpage as compared to the calls received at 425. For example, the calls received at 425, the first call received at 430, or both, may include queries for a product listing included within an online marketplace.

In some aspects, the first call received at 430 may include an indication of a user context for the request. Characteristics/parameters associated with a user context for the call may include but are not limited to, an identifier of the first client device (e.g., IP address, MAC address), a time that the first call was received, a session identifier associated with a viewing session in which the first call was received, characteristics or preferences associated with a user or profile of the first client device 405-a (e.g., user name, online marketplace account number), a network type on which the client device is operating, a device type of the first client device 405-a (e.g., smartphone, tablet, desktop, smart watch), a geographical location of the client device (e.g., country, region, or state in which the first client device 405-a is located), or any combination thereof.

At 435, the main server 410 may generate a token identifying the webpage indicated by the first call. In some aspects, the main server 410 may generate the token based on receiving the first call at 430. In some aspects, the main server 410 may be configured to generate the token in order to identify the webpage associated with the call and preserve the original user context of the first call. In this regard, the main server 410 may generate the token based on indications of the user context included within the first call. Thus, the token may include any data object or identifier which includes information identifying the webpage associated with the call, identifying characteristics of the first call, identifying characteristics of the first client device 405-a, or any combination thereof.

In some aspects, the main server 410 may be configured to generate the token based on a number of characteristics or parameters associated with the first client device 405-a, the first call itself, the webpage associated with the call, or any combination thereof. For example, characteristics/parameters which may be used to generate the token may include, but are not limited to, an identifier of the first client device (e.g., IP address, MAC address), a time that the first call was received, a session identifier associated with a viewing session in which the first call was received, characteristics or preferences associated with a user or profile of the first client device 405-a (e.g., user name, online marketplace account number), a network type on which the client device is operating, a device type of the first client device 405-a (e.g., smartphone, tablet, desktop, smart watch), a geographical location of the client device (e.g., country, region, or state in which the first client device 405-a is located), or any combination thereof. By way of another example, the token may be generated as a hashing function of one or more inputs, values, or parameters. In some aspects, the token generated by the main server 410 may include identifiers of the characteristics or parameters on which the token is based.

At 440, the main server 410 may identify one or more categorization parameters. In some aspects, the main server 410 may identify the one or more categorization parameters based on receiving the first call at 430, generating the token at 435, or both. The one or more categorization parameters may include any parameters or characteristics which may be used to categorize the set of webpage modules associated with the webpage requested by the first call into two or more subsets of webpage modules. Categorization parameters may include, but are not limited to, a relative order (e.g., relative priority) in which module data is to be displayed in the webpage, payload sizes of the respective webpage modules, retrieval durations for the respective modules, historical data (e.g., viewing history) of the client devices 405, viewing durations of module data of the webpages, or any combination thereof.

At 445, the main server 410 may categorize the set of webpage modules of the webpage requested by the first call into two or more subsets of webpage modules. In some aspects, the main server 410 may categorize the set of webpage modules based on the one or more categorization parameters identified at 440. As noted previously herein, each subset of webpage modules may be used to generate a respective server response which is returned to the first client device 405-*a*. In this regard, the main server 410 may categorize the set of webpage modules of the webpage based on a relative order in which module data is to be returned to the first client device 405-*a*. Accordingly, a first subset of webpage modules may be used to generate a first server response, and a second subset of webpage modules may be used to generate a second server response after the first server response. Moreover, additional subsets of webpage modules (e.g., third subset of webpage modules, fourth subset of webpage modules) may be used to generate additional server responses that are transmitted to the first client device 405-*a*.

For example, the main server 410 may be configured to categorize webpage modules which are executed for an initial rendering of the webpage within the first subset of webpage modules, and may categorize webpage modules which are not executed for the initial rendering of the webpage in a second (or later) subset of webpage modules. By way of another example, the main server 410 may categorize webpage modules with smaller data payload sizes and/or shorter retrieval durations in the first subset of webpage modules, and may categorize webpage modules with larger data payload sizes and/or longer retrieval durations in the second (or later) subset of webpage modules. In other cases, the main server 410 may be configured to categorize the webpage modules based on historical data (e.g., viewing history, call history) of the first client device 405-*a*.

In some aspects, the main server 410 may be configured to categorize the set of webpage modules using machine learning techniques. In particular, tracking data associated with the first client device 405-*a* and/or other client devices 405 (e.g., second client device 405-*b*) may be used to train one or more machine learning models which may subsequently be used to categorize sets of webpage modules in response to calls received from client devices 405. Specifically, main server 410 may be configured to process calls for an online marketplace, and may therefore receive a number of calls from a multitude of client devices 405. The respective calls may be requests for different webpages (e.g., different product listings), and may be received from users with differing interests, backgrounds, ages, genders, geographical locations, and the like. In this regard, the main server 410 may be configured to determine any quantity of parameters or characteristics associated with the calls, the client devices 405, or both, in order to train a machine learning model.

In some aspects, the machine learning models may be trained in order to enhance one or more criterion associated with generation of server responses in response to calls from client devices. For example, machine learning models may be trained in order to improve a speed at which module data is provided to client devices, reduce payload sizes of server responses delivered to client devices (e.g., tailoring what module data is included within each server response to reduce payload size of each respective server response), improve webpage engagement (e.g., increase time spent on webpage, increase "clicks" or selections on the webpage, Google My Business (GMB) improvement), and the like. Parameters which may be used to train the machine learning model may include, but are not limited to, a geographical location of the client device 405 (e.g., country or region), a network type of the client device 405, a device type of the client device (e.g., smartphone, tablet, desktop), historical data for each respective client device 405 (e.g., viewing histories), the types of webpages associated with the calls (e.g., the type of product listing such as single-item or multi-item listings, shipping options), use cases associated with each respective call, and the like.

Upon generating the machine learning model, the machine learning model may be used to categorize sets of webpage modules for subsequently received calls. In particular, the machine learning model may be configured to utilize parameters associated with a subsequent call (e.g., geographical location, historical data, device type) to categorize a set of webpage modules for the call. Techniques described herein may utilize machine learning techniques to more efficiently and effectively categorize webpage modules. Additionally, machine learning techniques may be used to tailor how webpage modules are categorized (and therefore tailor an order in which webpage data is delivered to the client device) on a client device 405 basis, such that each client device 405 may be associated with an individualized machine learning model which is specific to each particular client device 405. Moreover, different machine learning models may be generated for different demographics of users to further tailor webpage responses. For instance, a first machine learning model may be generated for female teenagers, a second machine learning model may be generated for users who have expressed interest in bulk savings options, a third machine learning model may be generated for calls received from smartphones, and a fourth machine learning model may be generated for calls received from desktop computers.

At 450, the main server 410 may delegate one or more subsets of webpage modules to the worker server (e.g., asynchronous delegation). In other words, the main server 410 may transmit an indication of one or more subsets of webpage modules to the worker server 420 along with an instruction for the worker server 420 to obtain the module data associated with the one or more subsets of webpage modules. The main server 410 may delegate the one or more subsets of webpage modules based on receiving the calls at 435, receiving the first call at 430, generating the token at 435, identifying the categorization parameters at 440, categorizing the set of webpage modules into two or more subsets at 445, or any combination thereof.

In some aspects, the main server 410 may additionally transmit an indication of the token to the worker server 420 when delegating the one or more subsets of webpage modules. In this regard, the worker server 420 may be configured to identify the original user context associated with the first call (e.g., geographical location of the first client device 405-*a*, type of client device (smartphone, tablet, desktop)), and may obtain the module data associated with the delegated subsets of webpage modules based on (e.g., in accordance with) the original user context. For example, the worker servers may be configured to identify that the client device 405-*a* includes a smartphone based on the token, and may therefore generate and/or retrieve the module data associated with the delegated webpage in a format which is compatible with smartphones.

Delegating one or more subsets of webpage modules to the worker server 420 may provide a number of advantages. First, by delegating webpage modules which are not executed for an initial rendering of the webpage at the client device 405-*a* and/or are only executed if subsequent calls are received, the main server 410 may preserve hardware and processing resources to generate/retrieve module data which will be displayed on the webpage first. This may enable the main server 410 to obtain module data associated with the first subset of webpage modules faster, thereby reducing a TTFB of the webpage at the first client device 405-*b*. Secondly, delegating one or more subsets of webpage modules may enable the worker server 420 to obtain module data associated with the delegated subsets of webpage modules while a first response is being generated and provided to the first client device 405-*b*. In this regard, module data associated with webpage modules which were delegated to the worker server 420 may be cached and retrieved quickly without any additional processing in the event additional calls are received from the first client device 405-*a*. Furthermore, delegating webpage modules which are associated with larger payload sizes and/or longer retrieval durations may further reduce the hardware and processing resources used to return a first response by the main server 410, which further reduces a TTFB at the first client device 405-*a*.

At 455, the main server 410 may process the first subset of webpage modules. In this regard, the main server 410 may generate or retrieve the first module data associated with the first subset of webpage modules. The main server 410 may process the first subset of webpage modules at 455 based on receiving the calls at 435, receiving the first call at 430, generating the token at 435, identifying the categorization parameters at 440, categorizing the set of webpage modules into two or more subsets at 445, delegating the one or more subsets of webpage modules at 450, or any combination thereof.

In some cases, the main server 410 may process the first subset of webpage modules in parallel (e.g., concurrently) with the worker server 420 processing the one or more delegated subsets of webpage modules. For example, in cases where the set of webpage modules of the webpage is categorized into a first subset of webpage modules and a second subset of webpage modules, the worker server 420 may process the second subset of webpage modules during at least a portion of time in which the main server 410 processes the first subset of webpage modules. Concurrent processing of the respective sets of webpage modules by the main server 410 and the worker server 420 may enable faster, more efficient processing of webpage calls.

At 460, the main server 410 may transmit a first response to the first client device 405-*a*. The first response may include the first module data associated with (e.g., generated or retrieved by) the first subset of webpage modules. Moreover, the first response may instruct the first client device 405-*a* to display the first module data in the webpage presented on a user interface (e.g., GUI) of the first client device 405-*a*. In some aspects, the main server 410 may transmit the first response at 460 based on receiving the calls at 435, receiving the first call at 430, generating the token at 435, identifying the categorization parameters at 440, categorizing the set of webpage modules into two or more subsets at 445, delegating the one or more subsets of webpage modules at 450, processing the first subset of webpage modules at 455, or any combination thereof.

In some aspects, the first response may include the token identifying the webpage. Thus, the main server 410 may indicate the original user context associated with the first call via the token included with the first response. In this regard, the first client device 405-*a* may be configured to determine that the first response is associated with the first call transmitted at 430, the webpage requested by the first call, or both. Preserving the original user context via the token may facilitate fast and efficient rendering of the first response within the webpage displayed at the first client device 405-*a*.

At 465, the first client device 405-*a* may display the first module data included with the first response in the webpage presented on a user interface (e.g., GUI) of the first client device 405-*a*. In other words, the first client device 405-*a* may render the webpage displayed on the user interface of the first client device 405-*a* using the first module data included with the first response. In this regard, the first client device 405-*a* may display the first module data based on transmitting the first call at 430, receiving the first response at 460, or both.

At 470, the worker server 420 may store module data in cache 415. The module data stored in cache 415 at 470 may include module data which was generated or retrieved as a result of processing the one or more subsets of webpage modules delegated to the worker server 420 at 450. For example, in cases where the main server 410 transmits an indication of a second subset of webpage modules to the worker server 420 (e.g., delegates the second subset of webpage modules), the worker server 420 may store the second module data associated with the second subset of webpage modules in cache 415. In some aspects, the worker server 420 may store the module data in cache 415 along with the token. Storing the token along with the cached module data may enable the main server 410 to quickly and efficiently identify that the cached data is associated with the respective webpage, the first client device 405-*a*, the first call, subsequent calls, or any combination thereof.

As noted previously herein, the worker server 420 may be configured to process the delegated webpage modules in parallel (e.g., concurrently) with the main server 410 processing the first subset of webpage modules. Moreover, the worker server 420 may be configured to process the webpage modules while the first client device 405-*a* is working to display the first response at 465. In this regard, techniques described herein may enable the first client device 405-*a* to begin processing and displaying the first response at 465 while the worker server 420 is still processing the delegated webpage modules.

At 475, the main server 410 may receive a second call from the first client device 405-*a*. In some aspects, the second call may include a request for the second module data associated with the second subset of webpage modules of the webpage. In some cases, the second call may be associated with the same webpage as the first call. For example, the first call may include a query for a webpage of a product listing, and the second call may include a request for customer reviews of the product listing. For instance, the second call may be transmitted in response to the user selecting a "customer reviews" button shown on the webpage of the product listing. In this regard, the first client device 405-*a* may transmit the second call based on transmitting the first call at 430, receiving the first response at 460, displaying the first response at 465, or any combination thereof.

In some aspects, the second call may include an indication of the token. In this regard, the second call may indicate the original user context associated with the first call. Thus, by including the token with the second call, the first client device 405-*a* may not need to transmit the full user context along with the second call. In other words, inclusion of the token with the second call may negate the need for the first client device 405-*a* to indicate other parameters or characteristics for the user context (e.g., geographical location, IP address, type of client device 405). Moreover, by including the token with the second call, the main server 410 may be able to quickly and efficiently identify that the second call is associated with the first call and/or same webpage requested by the first call. Furthermore, the token included within the second call may enable the main server 410 to quickly identify module data stored in cache that is requested by the second call.

At 480, the main server 410 may retrieve module data stored in cache 415. In some aspects, the main server 410 may retrieve module data stored in cache 415 based on receiving the second call at 475. For example, in cases where the second call requests the second module data, the main server 410 may be configured to retrieve the second module data (which was generated/retrieved by the worker server 420) from cache 415. In such cases, the main server 410 may be able to retrieve the data requested by the second call almost instantaneously, and with little to no additional processing. In additional or alternative aspects, the main server 410 may retrieve the second module data without receiving the second call. For example, in some cases, the main server 410 may identify when the second module data is stored in cache 415 (e.g., based on signaling from the worker server 420) and may retrieve the second module data based on identifying that it has been cached (e.g., without prompting from the second call).

At 485, the main server 410 may transmit a second response to the first client device 405-*a*. The second response may include the second module data associated the second subset of webpage modules. Moreover, the second response may instruct the first client device 405-*a* to display the second module data in the webpage presented on the user interface (e.g., GUI) of the first client device 405-*a*. In some aspects, the main server 410 may transmit the second response at 460 based on receiving the calls at 435, receiving the first call at 430, generating the token at 435, identifying the categorization parameters at 440, categorizing the set of webpage modules into two or more subsets at 445, delegating the one or more subsets of webpage modules at 450, processing the first subset of webpage modules at 455, transmitting the first response at 460, receiving the second call at 475, retrieving the second module data at 480, or any combination thereof.

In some aspects, the second response may include the token identifying the webpage. Thus, the main server 410 may indicate the user context associated with the first call and/or the second call via the token included with the second response. In this regard, the first client device 405-*a* may be configured to determine that the second response is associated with the first call transmitted at 430, the second call transmitted at 475, the webpage requested by the first and/or second calls, or any combination thereof. Preserving the original user context via the token may facilitate fast and efficient rendering of the second response within the webpage displayed at the first client device 405-*a*.

At 490, the first client device 405-*a* may display the second module data included with the second response in the webpage presented on a user interface (e.g., GUI) of the first client device 405-*a*. In other words, the first client device 405-*a* may render the webpage displayed on the user interface of the first client device 405-*a* using the second module data included with the second response. In this regard, the first client device 405-*a* may display the second module data based on transmitting the first call at 430, transmitting the second call at 475, receiving the second response at 485, or any combination thereof.

While process flow 400 illustrates only a first and second call being received from the first client device 405-*a*, it is contemplated herein that the first client device 405-*a* may transmit any quantity of calls. For example, while viewing a webpage for a product listing, a user may "click" or select to a drop down menu for color/style options, a drop down menu for shipping options, and a button for customer reviews, where each these "clicks" or selections results in a subsequent call transmitted to the main server 410. The main server 410 may then process each of the selections in this chain of calls (e.g., chain of requests or queries) as described in detail herein.

Techniques described herein may provide for faster, more efficient processing of webpage calls. In particular, responses to webpage calls received from a client device may be parsed up into two or more server responses, where each server response is associated with a subset of webpage modules of the webpage. By categorizing a set of webpage modules of a webpage into two or more subsets of webpage modules used to generate two or more server responses, techniques described herein may reduce processing resources required at the client device, improve the speed of server responses provided to the client device, and improve overall user experience. Efficient categorization of webpage modules may also be used to deliver webpage content to client devices in a more efficient manner by reducing a payload of server responses that are delivered to client devices without detrimentally affecting user experience or functionality at the client device. Moreover, the categorization techniques of webpage modules described herein may help tailor webpage content delivered to users, which may result in more time spent on webpages, more "clicks" or interactions with webpage content, and improved GMB performance.

Furthermore, delegating one or more subsets of webpage modules to a worker server may reduce hardware and processing resources of a main server used to return a first response to the client device, thereby further reducing a TTFB at the client device. Furthermore, by preserving an original user context of a webpage call via a token, processing of subsequent calls and/or subsequent calls by the main server and the client device, respectively, may be reduced, which further improves the speed of server responses in response to webpage calls.

Figure 5:
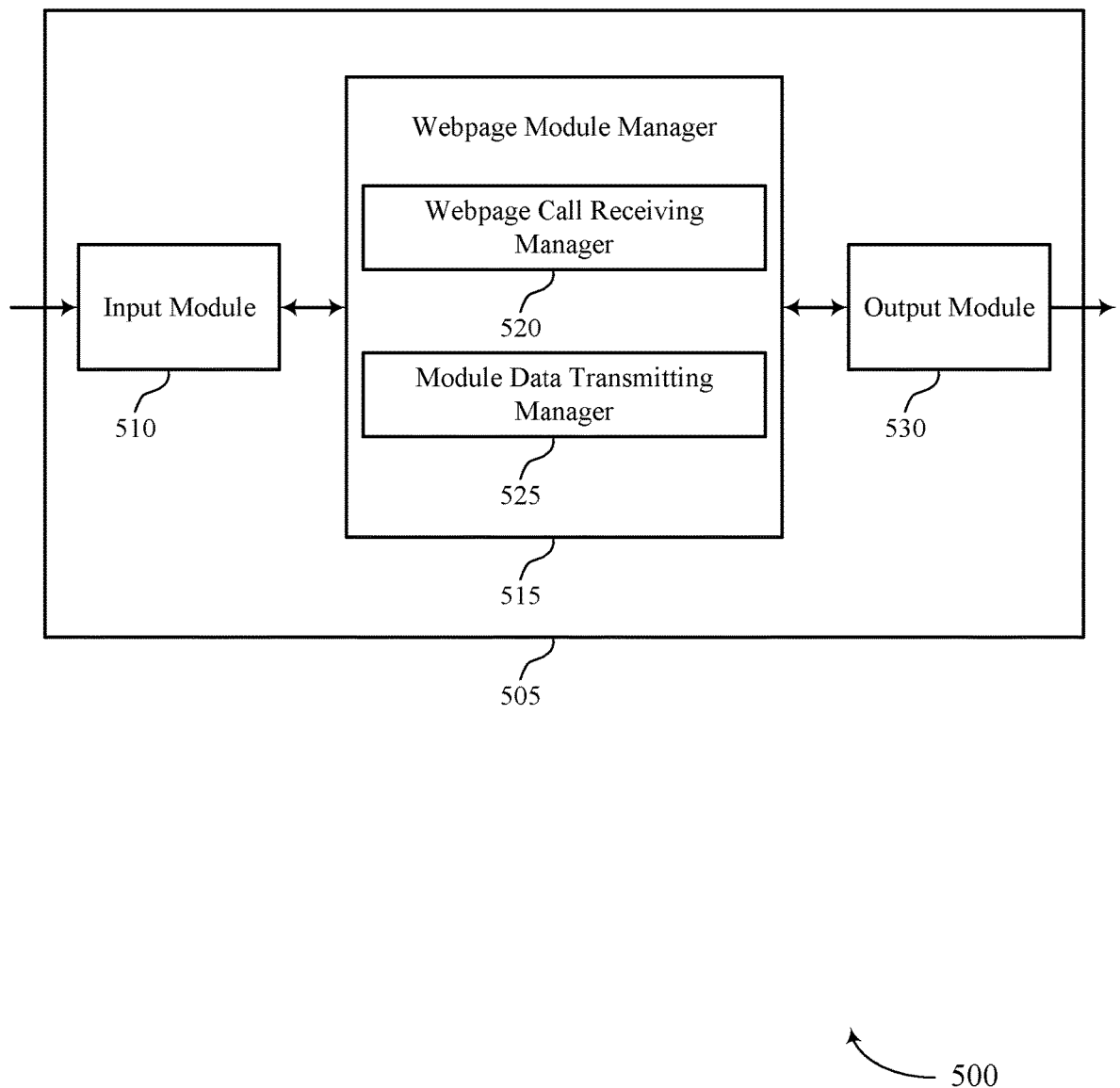
FIG. 5 shows a block diagram of an apparatus that supports multi request asynchronous delegation for enhanced performance in accordance with aspects of the present disclosure.

FIG. 5 shows a block diagram 500 of an apparatus 505 that supports multi request asynchronous delegation for enhanced performance in accordance with aspects of the present disclosure. The apparatus 505 may include an input module 510, a webpage module manager 515, and an output module 530. The apparatus 505 may also include a processor. Each of these components may be in communication with one another (e.g., via one or more buses). In some cases, the apparatus 505 may be an example of a user terminal, a database server, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the webpage module manager 515 to support data retention handling for data object stores. In some cases, the input module 510 may be a component of an input/output (I/O) controller 715 as described with reference to FIG. 7.

The webpage module manager 515 may include a webpage call receiving manager 520 and a module data transmitting manager 525. The webpage module manager 515 may be an example of aspects of the webpage module manager 605 or 710 described with reference to FIGS. 6 and 7.

The webpage module manager 515 and/or at least some of its various sub-components may be implemented in hardware, software executed by a processor, firmware, or any combination thereof. If implemented in software executed by a processor, the functions of the webpage module manager 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The webpage module manager 515 and/or at least some of its various sub-components may be physically located at various positions, including being distributed such that portions of functions are implemented at different physical locations by one or more physical devices. In some examples, the webpage module manager 515 and/or at least some of its various sub-components may be a separate and distinct component in accordance with various aspects of the present disclosure. In other examples, the webpage module manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The webpage call receiving manager 520 may receive, from a client device, a first call for module data associated with a set of webpage modules for presentation in a webpage.

The module data transmitting manager 525 may transmit, to the client device based on receiving the first call, a first response including first module data associated with a first subset of the set of webpage modules, and a token identifying the webpage, the first response instructing the client device to display the first module data associated with the first subset of the set of webpage modules in the webpage and transmit, to the client device based on transmitting the first response, a second response including the token identifying the webpage and second module data associated with a second subset of the set of webpage modules that differs from the first subset of the set of webpage modules.

The output module 530 may manage output signals for the apparatus 505. For example, the output module 530 may receive signals from other components of the apparatus 505, such as the webpage module manager 515, and may transmit these signals to other components or devices. In some specific examples, the output module 530 may transmit output signals for display in a user interface, for storage in a database or data store, for further processing at a server or server cluster, or for any other processes at any number of devices or systems. In some cases, the output module 530 may be a component of an I/O controller 715 as described with reference to FIG. 7.

Figure 6:
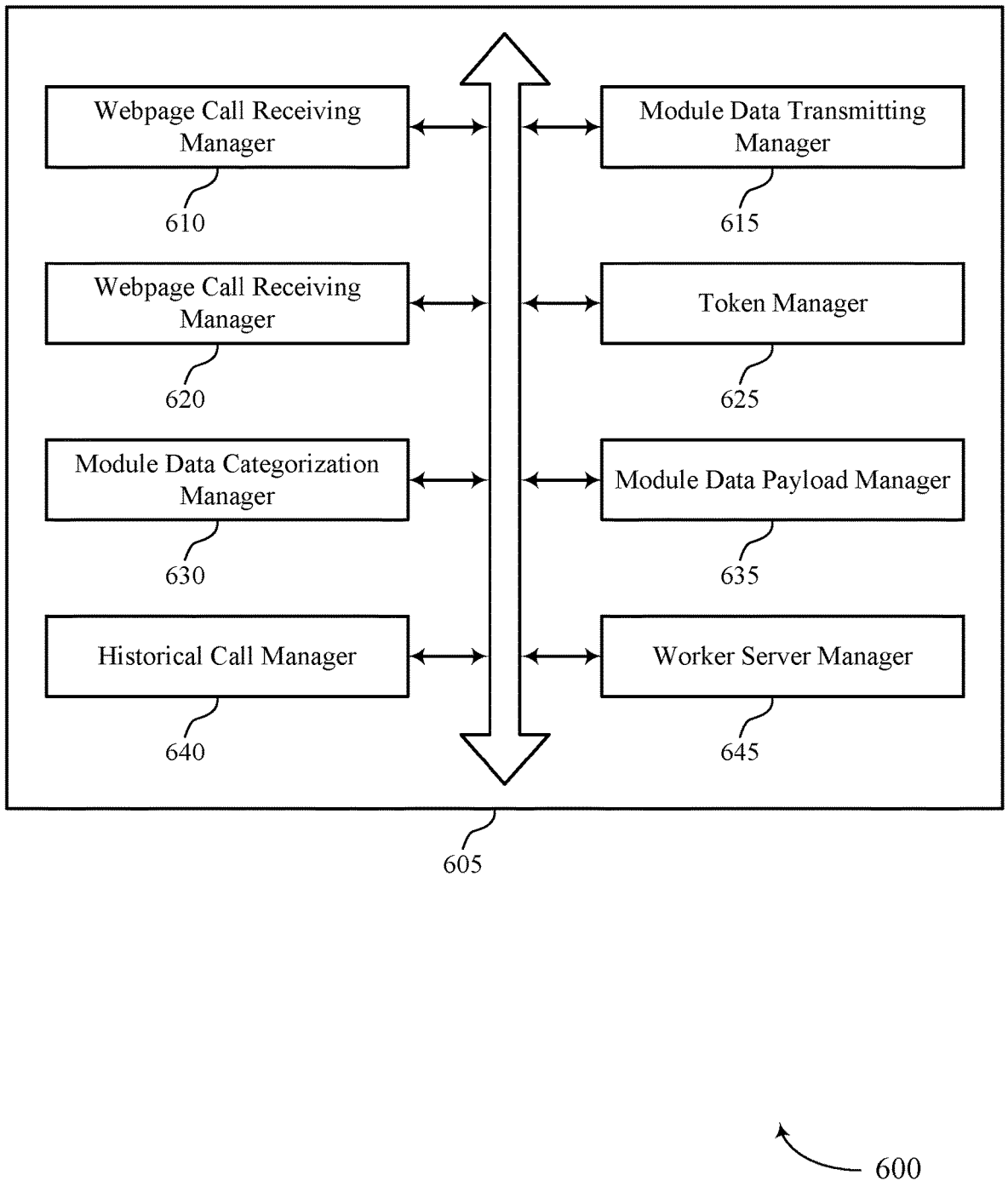
FIG. 6 shows a block diagram of a webpage module manager that supports multi request asynchronous delegation for enhanced performance in accordance with aspects of the present disclosure.

FIG. 6 shows a block diagram 600 of a webpage module manager 605 that supports multi request asynchronous delegation for enhanced performance in accordance with aspects of the present disclosure. The webpage module manager 605 may be an example of aspects of a webpage module manager 515 or a webpage module manager 710 described herein. The webpage module manager 605 may include a webpage call receiving manager 610, a module data transmitting manager 615, a webpage call receiving manager 620, a token manager 625, a module data categorization manager 630, a module data payload manager 635, a historical call manager 640, and a worker server manager 645. Each of these modules may communicate, directly or indirectly, with one another (e.g., via one or more buses).

The webpage call receiving manager 610 may receive, from a client device, a first call for module data associated with a set of webpage modules for presentation in a webpage.

The module data transmitting manager 615 may transmit, to the client device based on receiving the first call, a first response including first module data associated with a first subset of the set of webpage modules, and a token identifying the webpage, the first response instructing the client device to display the first module data associated with the first subset of the set of webpage modules in the webpage.

In some examples, the module data transmitting manager 615 may transmit, to the client device based on transmitting the first response, a second response including the token identifying the webpage and second module data associated with a second subset of the set of webpage modules that differs from the first subset of the set of webpage modules. In some examples, the module data transmitting manager 615 may transmit, in the second response, an instruction for the client device to display the second module data associated with the second subset of the set of webpage modules in the webpage.

The webpage call receiving manager 620 may receive, from the client device, a second call including the token identifying the webpage and requesting the second module data associated with the second subset of the set of webpage modules, where the second response is transmitted based on receiving the second call. In some examples, the webpage call receiving manager 620 may receive, from one or more client devices, a set of requests for module data associated with the set of webpage modules for presentation in the webpage.

The token manager 625 may generate the token identifying the webpage based on receiving the first call, where transmitting the first response, transmitting the second response, or both, is based on generating the token identifying the webpage.

The module data categorization manager 630 may identify that the first module data is to be displayed by the client device prior to the second module data. In some examples, the module data categorization manager 630 may categorize the set of webpage modules into the first subset and the second subset based on identifying that the first module data is to be displayed by the client device prior to the second module data, where the first response is transmitted prior to the second response based on the categorizing.

The module data payload manager 635 may identify one or more payload sizes, one or more retrieval durations, or both, associated with one or more webpage modules of the set of webpage modules. In some examples, the module data categorization manager 630 may categorize the set of webpage modules into the first subset and the second subset based on the one or more identified payload sizes, the one or more retrieval durations, or both.

The historical call manager 640 may identify historical data associated with a set of calls received from the client device. In some examples, the module data categorization manager 630 may categorize the set of webpage modules into the first subset and the second subset based on the historical data.

In some examples, the historical call manager 640 may identify one or more webpage viewing durations associated with the set of calls received from the client device, where categorizing the set of webpage modules into the first subset and the second subset is based on the one or more webpage viewing durations. In some examples, the module data categorization manager 630 may categorize the set of webpage modules into the first subset and the second subset based on a machine learning model trained using the set of requests.

The worker server manager 645 may transmit, to one or more worker servers based on receiving the first call, an indication of the second subset of set of modules and an instruction to obtain the second module data associated with the second subset of the set of webpage modules, where the second response is based on transmitting the indication of the second subset of webpage modules to the one or more worker servers.

Figure 7:
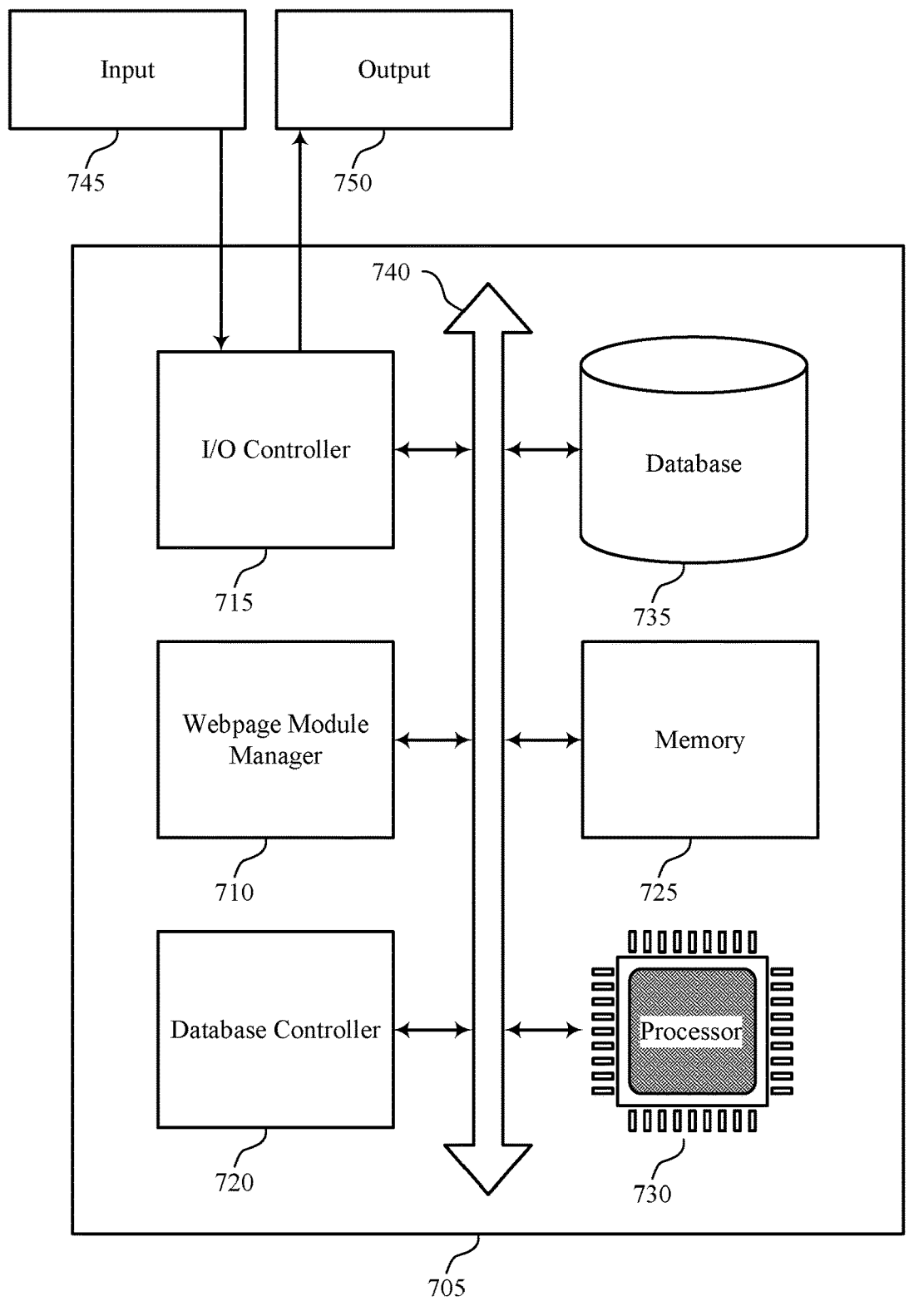
FIG. 7 shows a diagram of a system including a device that supports multi request asynchronous delegation for enhanced performance in accordance with aspects of the present disclosure.

FIG. 7 shows a diagram of a system 700 including a device 705 that supports multi request asynchronous delegation for enhanced performance in accordance with aspects of the present disclosure. The device 705 may be an example of or include the components of an application server or an apparatus 505 as described herein. The device 705 may include components for bi-directional data communications including components for transmitting and receiving communications, including a webpage module manager 710, an I/O controller 715, a database controller 720, memory 725, a processor 730, and a database 735. These components may be in electronic communication via one or more buses (e.g., bus 740).

The webpage module manager 710 may be an example of a webpage module manager 515 or 605 as described herein. For example, the webpage module manager 710 may perform any of the methods or processes described above with reference to FIGS. 5 and 6. In some cases, the webpage module manager 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting multi request asynchronous delegation for enhanced performance).

Figure 8:
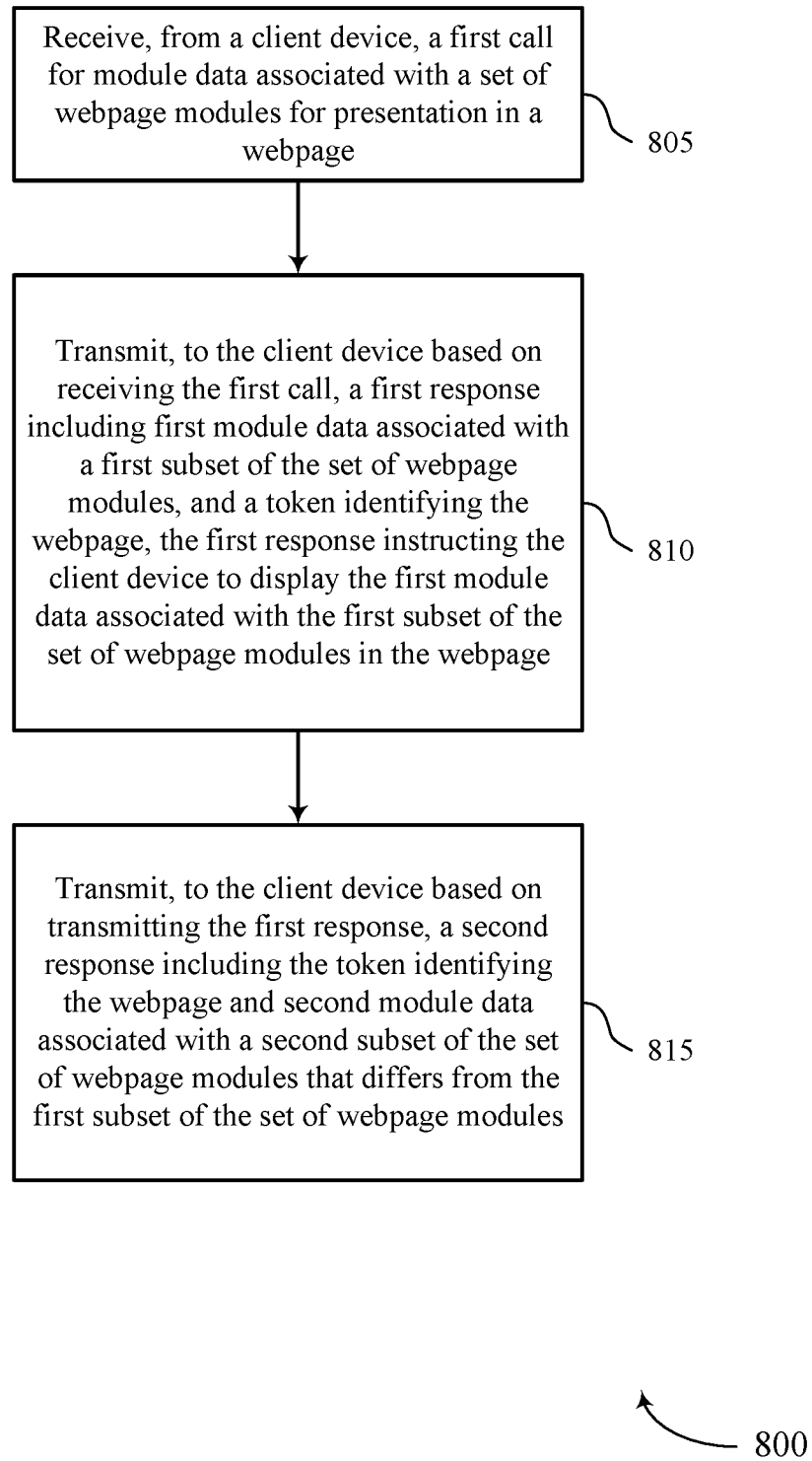
FIGS. 8 through 11 show flowcharts illustrating methods that support multi request asynchronous delegation for enhanced performance in accordance with aspects of the present disclosure.

FIG. 8 shows a flowchart illustrating a method 800 that supports multi request asynchronous delegation for enhanced performance in accordance with aspects of the present disclosure. The operations of method 800 may be implemented by an application server or its components as described herein. For example, the operations of method 800 may be performed by a webpage module manager as described with reference to FIGS. 5 through 7. In some examples, an application server may execute a set of instructions to control the functional elements of the application server to perform the functions described below. Additionally or alternatively, an application server may perform aspects of the functions described below using special-purpose hardware.

At 805, the application server may receive, from a client device, a first call for module data associated with a set of webpage modules for presentation in a webpage. The operations of 805 may be performed according to the methods described herein. In some examples, aspects of the operations of 805 may be performed by a webpage call receiving manager as described with reference to FIGS. 5 through 7.

At 810, the application server may transmit, to the client device based on receiving the first call, a first response including first module data associated with a first subset of the set of webpage modules, and a token identifying the webpage, the first response instructing the client device to display the first module data associated with the first subset of the set of webpage modules in the webpage. The operations of 810 may be performed according to the methods described herein. In some examples, aspects of the operations of 810 may be performed by a module data transmitting manager as described with reference to FIGS. 5 through 7.

At 815, the application server may transmit, to the client device based on transmitting the first response, a second response including the token identifying the webpage and second module data associated with a second subset of the set of webpage modules that differs from the first subset of the set of webpage modules. The operations of 815 may be performed according to the methods described herein. In some examples, aspects of the operations of 815 may be performed by a module data transmitting manager as described with reference to FIGS. 5 through 7.

Figure 9:
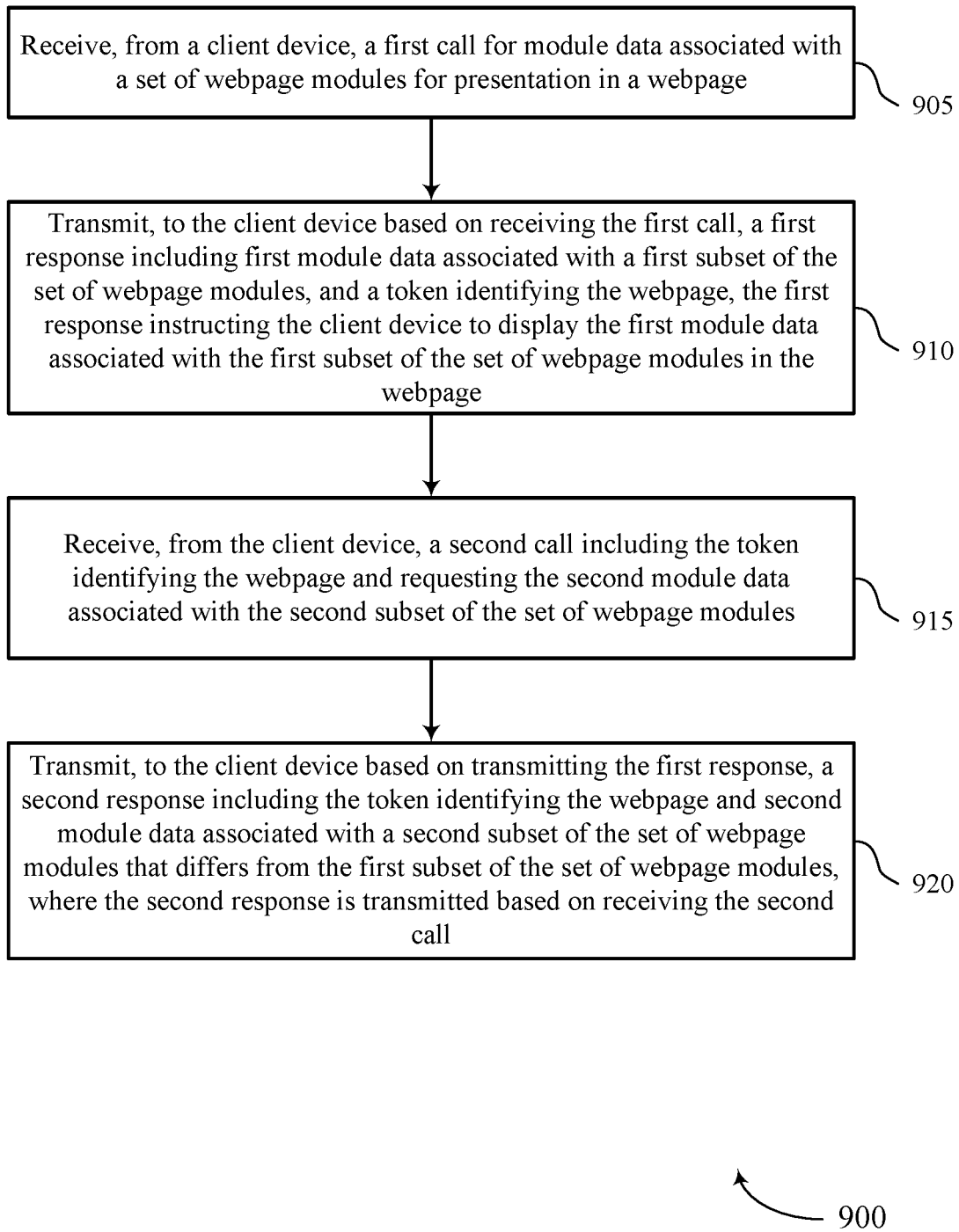

FIG. 9 shows a flowchart illustrating a method 900 that supports multi request asynchronous delegation for enhanced performance in accordance with aspects of the present disclosure. The operations of method 900 may be implemented by an application server or its components as described herein. For example, the operations of method 900 may be performed by a webpage module manager as described with reference to FIGS. 5 through 7. In some examples, an application server may execute a set of instructions to control the functional elements of the application server to perform the functions described below. Additionally or alternatively, an application server may perform aspects of the functions described below using special-purpose hardware.

At 905, the application server may receive, from a client device, a first call for module data associated with a set of webpage modules for presentation in a webpage. The operations of 905 may be performed according to the methods described herein. In some examples, aspects of the operations of 905 may be performed by a webpage call receiving manager as described with reference to FIGS. 5 through 7.

At 910, the application server may transmit, to the client device based on receiving the first call, a first response including first module data associated with a first subset of the set of webpage modules, and a token identifying the webpage, the first response instructing the client device to display the first module data associated with the first subset of the set of webpage modules in the webpage. The operations of 910 may be performed according to the methods described herein. In some examples, aspects of the operations of 910 may be performed by a module data transmitting manager as described with reference to FIGS. 5 through 7.

At 915, the application server may receive, from the client device, a second call including the token identifying the webpage and requesting the second module data associated with the second subset of the set of webpage modules. The operations of 915 may be performed according to the methods described herein. In some examples, aspects of the operations of 915 may be performed by a webpage call receiving manager as described with reference to FIGS. 5 through 7.

At 920, the application server may transmit, to the client device based on transmitting the first response, a second response including the token identifying the webpage and second module data associated with a second subset of the set of webpage modules that differs from the first subset of the set of webpage modules, where the second response is transmitted based on receiving the second call. The operations of 920 may be performed according to the methods described herein. In some examples, aspects of the operations of 920 may be performed by a module data transmitting manager as described with reference to FIGS. 5 through 7.

Figure 10:
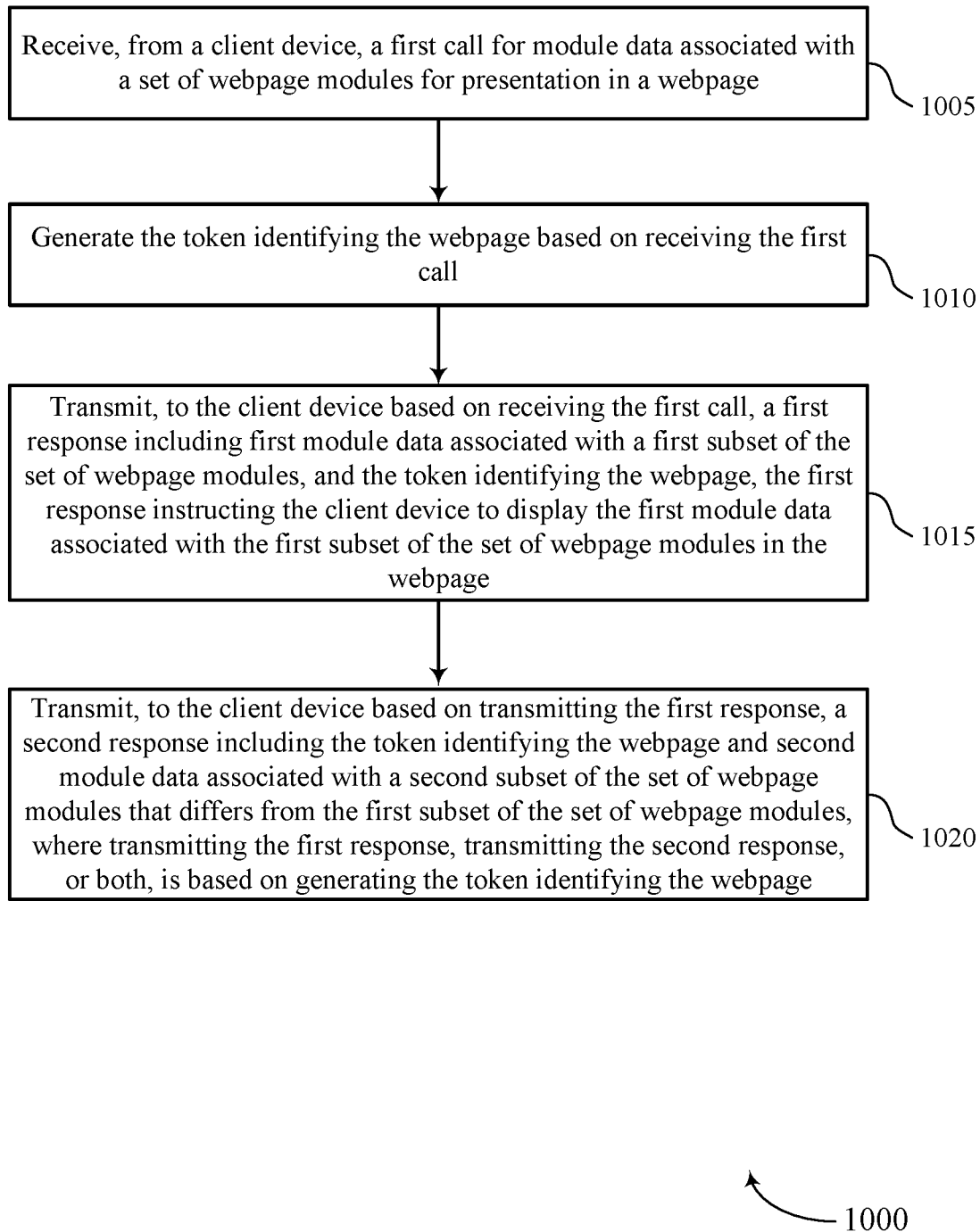

FIG. 10 shows a flowchart illustrating a method 1000 that supports multi request asynchronous delegation for enhanced performance in accordance with aspects of the present disclosure. The operations of method 1000 may be implemented by an application server or its components as described herein. For example, the operations of method 1000 may be performed by a webpage module manager as described with reference to FIGS. 5 through 7. In some examples, an application server may execute a set of instructions to control the functional elements of the application server to perform the functions described below. Additionally or alternatively, an application server may perform aspects of the functions described below using special-purpose hardware.

At 1005, the application server may receive, from a client device, a first call for module data associated with a set of webpage modules for presentation in a webpage. The operations of 1005 may be performed according to the methods described herein. In some examples, aspects of the operations of 1005 may be performed by a webpage call receiving manager as described with reference to FIGS. 5 through 7.

At 1010, the application server may generate the token identifying the webpage based on receiving the first call. The operations of 1010 may be performed according to the methods described herein. In some examples, aspects of the operations of 1010 may be performed by a token manager as described with reference to FIGS. 5 through 7.

At 1015, the application server may transmit, to the client device based on receiving the first call, a first response including first module data associated with a first subset of the set of webpage modules, and the token identifying the webpage, the first response instructing the client device to display the first module data associated with the first subset of the set of webpage modules in the webpage. The operations of 1015 may be performed according to the methods described herein. In some examples, aspects of the operations of 1015 may be performed by a module data transmitting manager as described with reference to FIGS. 5 through 7.

At 1020, the application server may transmit, to the client device based on transmitting the first response, a second response including the token identifying the webpage and second module data associated with a second subset of the set of webpage modules that differs from the first subset of the set of webpage modules, where transmitting the first response, transmitting the second response, or both, is based on generating the token identifying the webpage. The operations of 1020 may be performed according to the methods described herein. In some examples, aspects of the operations of 1020 may be performed by a module data transmitting manager as described with reference to FIGS. 5 through 7.

Figure 11:
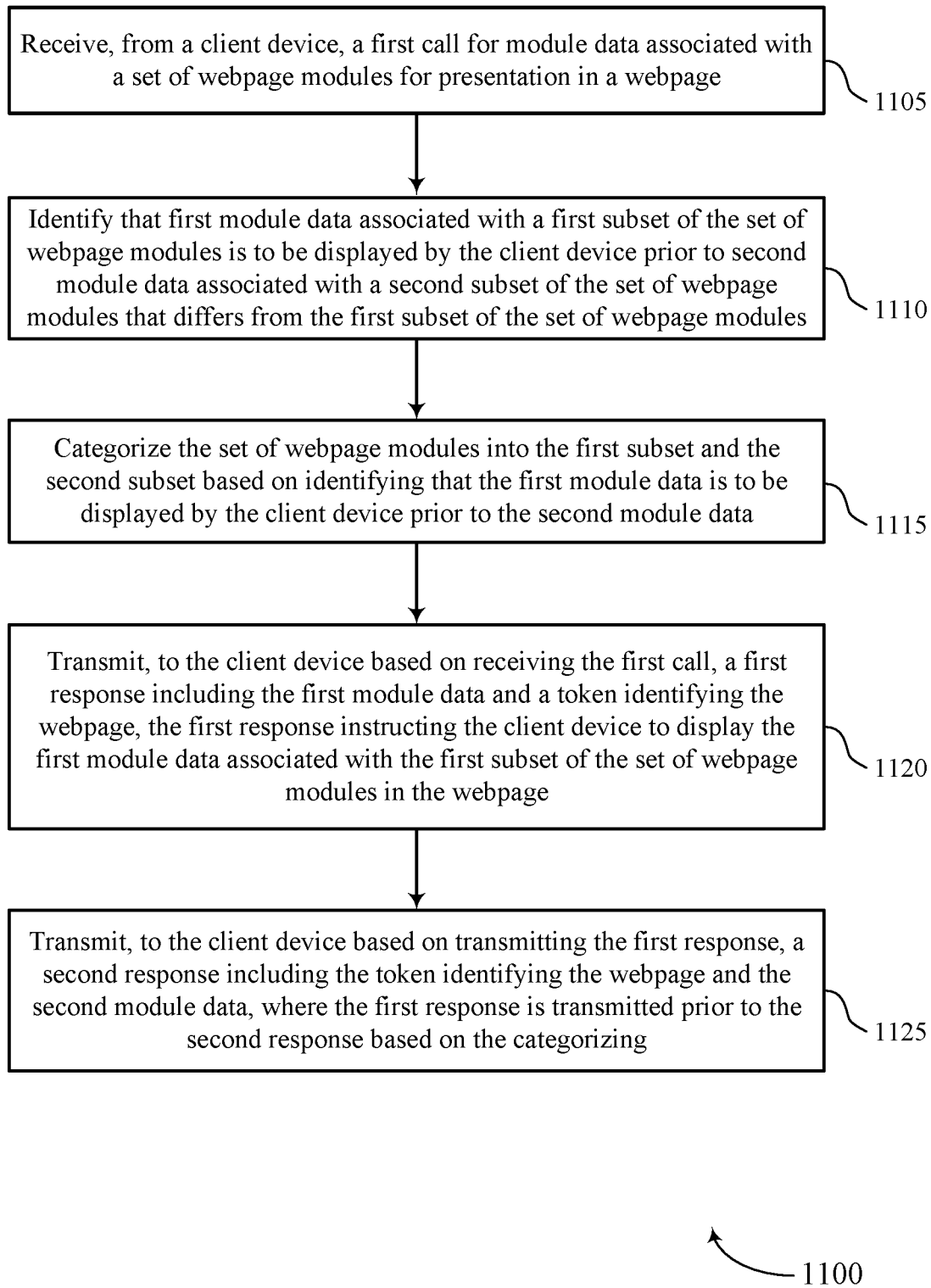

FIG. 11 shows a flowchart illustrating a method 1100 that supports multi request asynchronous delegation for enhanced performance in accordance with aspects of the present disclosure. The operations of method 1100 may be implemented by an application server or its components as described herein. For example, the operations of method 1100 may be performed by a webpage module manager as described with reference to FIGS. 5 through 7. In some examples, an application server may execute a set of instructions to control the functional elements of the application server to perform the functions described below. Additionally or alternatively, an application server may perform aspects of the functions described below using special-purpose hardware.

At 1105, the application server may receive, from a client device, a first call for module data associated with a set of webpage modules for presentation in a webpage. The operations of 1105 may be performed according to the methods described herein. In some examples, aspects of the operations of 1105 may be performed by a webpage call receiving manager as described with reference to FIGS. 5 through 7.

At 1110, the application server may identify that first module data associated with a first subset of the set of webpage modules is to be displayed by the client device prior to second module data associated with a second subset of the set of webpage modules that differs from the first subset of the set of webpage modules. The operations of 1110 may be performed according to the methods described herein. In some examples, aspects of the operations of 1110 may be performed by a module data categorization manager as described with reference to FIGS. 5 through 7.

At 1115, the application server may categorize the set of webpage modules into the first subset and the second subset based on identifying that the first module data is to be displayed by the client device prior to the second module data. The operations of 1115 may be performed according to the methods described herein. In some examples, aspects of the operations of 1115 may be performed by a module data categorization manager as described with reference to FIGS. 5 through 7.

At 1120, the application server may transmit, to the client device based on receiving the first call, a first response including the first module data and a token identifying the webpage, the first response instructing the client device to display the first module data associated with the first subset of the set of webpage modules in the webpage. The operations of 1120 may be performed according to the methods described herein. In some examples, aspects of the operations of 1120 may be performed by a module data transmitting manager as described with reference to FIGS. 5 through 7.

At 1125, the application server may transmit, to the client device based on transmitting the first response, a second response including the token identifying the webpage and the second module data, where the first response is transmitted prior to the second response based on the categorizing. The operations of 1125 may be performed according to the methods described herein. In some examples, aspects of the operations of 1125 may be performed by a module data transmitting manager as described with reference to FIGS. 5 through 7.

A computer-implemented method at a server is described. The method may include receiving, from a client device, a first call for module data associated with a set of webpage modules for presentation in a webpage, transmitting, to the client device based on receiving the first call, a first response including first module data associated with a first subset of the set of webpage modules, and a token identifying the webpage, the first response instructing the client device to display the first module data associated with the first subset of the set of webpage modules in the webpage, and transmitting, to the client device based on transmitting the first response, a second response including the token identifying the webpage and second module data associated with a second subset of the set of webpage modules that differs from the first subset of the set of webpage modules.

A system is described. The system may include a processor, memory coupled with the processor, and instructions stored in the memory. The instructions may be executable by the processor to cause the apparatus to receive, from a client device, a first call for module data associated with a set of webpage modules for presentation in a webpage, transmit, to the client device based on receiving the first call, a first response including first module data associated with a first subset of the set of webpage modules, and a token identifying the webpage, the first response instructing the client device to display the first module data associated with the first subset of the set of webpage modules in the webpage, and transmit, to the client device based on transmitting the first response, a second response including the token identifying the webpage and second module data associated with a second subset of the set of webpage modules that differs from the first subset of the set of webpage modules.

Another system is described. The system may include means for receiving, from a client device, a first call for module data associated with a set of webpage modules for presentation in a webpage, transmitting, to the client device based on receiving the first call, a first response including first module data associated with a first subset of the set of webpage modules, and a token identifying the webpage, the first response instructing the client device to display the first module data associated with the first subset of the set of webpage modules in the webpage, and transmitting, to the client device based on transmitting the first response, a second response including the token identifying the webpage and second module data associated with a second subset of the set of webpage modules that differs from the first subset of the set of webpage modules.

A non-transitory computer-readable medium storing code for a computer-implemented method at a server is described. The code may include instructions executable by a processor to receive, from a client device, a first call for module data associated with a set of webpage modules for presentation in a webpage, transmit, to the client device based on receiving the first call, a first response including first module data associated with a first subset of the set of webpage modules, and a token identifying the webpage, the first response instructing the client device to display the first module data associated with the first subset of the set of webpage modules in the webpage, and transmit, to the client device based on transmitting the first response, a second response including the token identifying the webpage and second module data associated with a second subset of the set of webpage modules that differs from the first subset of the set of webpage modules.

Some examples of the method, apparatuses, and non-transitory computer-readable medium described herein may further include operations, features, means, or instructions for receiving, from the client device, a second call including the token identifying the webpage and requesting the second module data associated with the second subset of the set of webpage modules, where the second response may be transmitted based on receiving the second request.

Some examples of the method, apparatuses, and non-transitory computer-readable medium described herein may further include operations, features, means, or instructions for generating the token identifying the webpage based on receiving the first call, where transmitting the first response, transmitting the second response, or both, may be based on generating the token identifying the webpage.

Some examples of the method, apparatuses, and non-transitory computer-readable medium described herein may further include operations, features, means, or instructions for transmitting, in the second response, an instruction for the client device to display the second module data associated with the second subset of the set of webpage modules in the webpage.

Some examples of the method, apparatuses, and non-transitory computer-readable medium described herein may further include operations, features, means, or instructions for identifying that the first module data may be to be displayed by the client device prior to the second module data, and categorizing the set of webpage modules into the first subset and the second subset based on identifying that the first module data may be to be displayed by the client device prior to the second module data, where the first response may be transmitted prior to the second response based on the categorizing.

Some examples of the method, apparatuses, and non-transitory computer-readable medium described herein may further include operations, features, means, or instructions for identifying one or more payload sizes, one or more retrieval durations, or both, associated with one or more webpage modules of the set of webpage modules, and categorizing the set of webpage modules into the first subset and the second subset based on the one or more identified payload sizes, the one or more retrieval durations, or both.

Some examples of the method, apparatuses, and non-transitory computer-readable medium described herein may further include operations, features, means, or instructions for identifying historical data associated with a set of calls received from the client device, and categorizing the set of webpage modules into the first subset and the second subset based on the historical data.

Some examples of the method, apparatuses, and non-transitory computer-readable medium described herein may further include operations, features, means, or instructions for identifying one or more webpage viewing durations associated with the set of calls received from the client device, where categorizing the set of webpage modules into the first subset and the second subset may be based on the one or more webpage viewing durations.

Some examples of the method, apparatuses, and non-transitory computer-readable medium described herein may further include operations, features, means, or instructions for receiving, from one or more client devices, a set of requests for module data associated with the set of webpage modules for presentation in the webpage, and categorizing the set of webpage modules into the first subset and the second subset based on a machine learning model trained using the set of requests.

Some examples of the method, apparatuses, and non-transitory computer-readable medium described herein may further include operations, features, means, or instructions for transmitting, to one or more worker servers based on receiving the first call, an indication of the second subset of set of modules and an instruction to obtain the second module data associated with the second subset of the set of webpage modules, where the second response may be based on transmitting the indication of the second subset of webpage modules to the one or more worker servers.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A computer-implemented method at a server comprising:
   receiving, from a client device, a call for module data associated with a plurality of webpage modules for presentation in a webpage;
   transmitting, to a first worker server based at least in part on receiving the call, a first instruction to retrieve first module data associated with a first subset of the plurality of webpage modules, and a token identifying the webpage;
   receiving, from the first worker server and in response to the first instruction, the first module data associated with the first subset of the plurality of webpage modules and the token; and
   transmitting, to the client device based at least in part on receiving the first module data, a first response comprising the first module data and the token identifying the webpage, the first response instructing the client device to display the first module data associated with the first subset of the plurality of webpage modules in the webpage.

2. The computer-implemented method of claim 1, further comprising:
   retrieving, based at least in part on receiving the call, second module data associated with a second subset of the plurality of webpage modules; and
   transmitting, to the client device via a second response, the second module data and the token identifying the webpage, wherein the second response instructs the client device to display the second module data associated with the second subset of the plurality of webpage modules in the webpage.

3. The computer-implemented method of claim 2, wherein retrieving the second module data comprises:
   retrieving the second module data during at least a portion of time in which the first worker server retrieves the first module data.

4. The computer-implemented method of claim 1, further comprising:
   transmitting, to a second worker server based at least in part on receiving the call, a second instruction to obtain second module data associated with a second subset of the plurality of webpage modules, and the token identifying the webpage;
   receiving, from the second worker server and in response to the second instruction, the second module data associated with the second subset of the plurality of webpage modules and the token; and
   transmitting, to the client device via a second response, the second module data and the token identifying the webpage, wherein the second response instructs the client device to display the second module data associated with the second subset of the plurality of webpage modules in the webpage.

5. The computer-implemented method of claim 1, further comprising:
   transmitting, to the client device based at least in part on transmitting the first response, a second response comprising the token identifying the webpage and second module data associated with a second subset of the plurality of webpage modules that differs from the first subset of the plurality of webpage modules.

6. The computer-implemented method of claim 5, further comprising:
   categorizing the plurality of webpage modules into the first subset and the second subset based at least in part on one or more characteristics associated with the call, the first module data, the second module data, or any combination thereof, wherein transmitting the first response and the second response is based at least in part on the categorizing.

7. The computer-implemented method of claim 6, wherein the one or more characteristics comprises a relative order in which the first module data and the second module data are to be displayed by the client device, payload sizes of the first module data and the second module data, retrieval durations of the first module data and the second module data, historical data associated with a plurality of calls received from the client device, or any combination thereof.

8. The computer-implemented method of claim 5, further comprising:
   categorizing the plurality of webpage modules into the first subset and the second subset based at least in part on one or more webpage viewing durations associated with a plurality of calls received from the client device, wherein transmitting the first response and the second response is based at least in part on the categorizing.

9. A system comprising:
   one or more processors; and
   a non-transitory computer-readable medium storing instructions that, when executed by the one or more processors, cause the system to perform operations comprising:
      receiving, from a client device, a call for module data associated with a plurality of webpage modules for presentation in a webpage;
      transmitting, to a first worker server based at least in part on receiving the call, a first instruction to retrieve first module data associated with a first subset of the plurality of webpage modules, and a token identifying the webpage;

receiving, from the first worker server and in response to the first instruction, the first module data associated with the first subset of the plurality of webpage modules and the token; and transmitting, to the client device based at least in part on receiving the first module data, a first response comprising the first module data and the token identifying the webpage, the first response instructing the client device to display the first module data associated with the first subset of the plurality of webpage modules in the webpage.

10. The system of claim 9, wherein the instructions are further executable by the one or more processors to cause the system to perform operations comprising:

retrieving, based at least in part on receiving the call, second module data associated with a second subset of the plurality of webpage modules; and transmitting, to the client device via a second response, the second module data and the token identifying the webpage, wherein the second response instructs the client device to display the second module data associated with the second subset of the plurality of webpage modules in the webpage.

11. The system of claim 9, wherein the instructions are further executable by the one or more processors to cause the system to perform operations comprising:

transmitting, to a second worker server based at least in part on receiving the call, a second instruction to obtain second module data associated with a second subset of the plurality of webpage modules, and the token identifying the webpage;

receiving, from the second worker server and in response to the second instruction, the second module data associated with the second subset of the plurality of webpage modules and the token; and transmitting, to the client device via a second response, the second module data and the token identifying the webpage, wherein the second response instructs the client device to display the second module data associated with the second subset of the plurality of webpage modules in the webpage.

12. The system of claim 9, wherein the instructions are further executable by the one or more processors to cause the system to perform operations comprising:

transmitting, to the client device based at least in part on transmitting the first response, a second response comprising the token identifying the webpage and second module data associated with a second subset of the plurality of webpage modules that differs from the first subset of the plurality of webpage modules.

13. The system of claim 12, wherein the instructions are further executable by the one or more processors to cause the system to perform operations comprising:

categorizing the plurality of webpage modules into the first subset and the second subset based at least in part on one or more characteristics associated with the call, the first module data, the second module data, or any combination thereof, wherein transmitting the first response and the second response is based at least in part on the categorizing.

14. The system of claim 13, wherein the one or more characteristics comprises a relative order in which the first module data and the second module data are to be displayed by the client device, payload sizes of the first module data and the second module data, retrieval durations of the first module data and the second module data, historical data associated with a plurality of calls received from the client device, or any combination thereof.

15. The system of claim 12, wherein the instructions are further executable by the one or more processors to cause the system to perform operations comprising:

categorizing the plurality of webpage modules into the first subset and the second subset based at least in part on one or more webpage viewing durations associated with a plurality of calls received from the client device, wherein transmitting the first response and the second response is based at least in part on the categorizing.

16. A non-transitory computer-readable medium storing instructions which, when executed by a processor, cause a system to perform operations comprising:

receiving, from a client device, a call for module data associated with a plurality of webpage modules for presentation in a webpage;

transmitting, to a first worker server based at least in part on receiving the call, a first instruction to retrieve first module data associated with a first subset of the plurality of webpage modules, and a token identifying the webpage;

receiving, from the first worker server and in response to the first instruction, the first module data associated with the first subset of the plurality of webpage modules and the token; and transmitting, to the client device based at least in part on receiving the first module data, a first response comprising the first module data and the token identifying the webpage, the first response instructing the client device to display the first module data associated with the first subset of the plurality of webpage modules in the webpage.

17. The non-transitory computer-readable medium of claim 16, wherein the instructions are further executable by the processor to cause the system to perform operations comprising:

retrieving, based at least in part on receiving the call, second module data associated with a second subset of the plurality of webpage modules; and transmitting, to the client device via a second response, the second module data and the token identifying the webpage, wherein the second response instructs the client device to display the second module data associated with the second subset of the plurality of webpage modules in the webpage.

18. The non-transitory computer-readable medium of claim 16, wherein the instructions are further executable by the processor to cause the system to perform operations comprising:

transmitting, to a second worker server based at least in part on receiving the call, a second instruction to obtain second module data associated with a second subset of the plurality of webpage modules, and the token identifying the webpage;

receiving, from the second worker server and in response to the second instruction, the second module data associated with the second subset of the plurality of webpage modules and the token; and transmitting, to the client device via a second response, the second module data and the token identifying the webpage, wherein the second response instructs the client device to display the second module data associated with the second subset of the plurality of webpage modules in the webpage.

19. The non-transitory computer-readable medium of claim 16, wherein the instructions are further executable by the processor to cause the system to perform operations comprising:

transmitting, to the client device based at least in part on transmitting the first response, a second response comprising the token identifying the webpage and second module data associated with a second subset of the plurality of webpage modules that differs from the first subset of the plurality of webpage modules.

20. The non-transitory computer-readable medium of claim 19, wherein the instructions are further executable by the processor to cause the system to perform operations comprising:

categorizing the plurality of webpage modules into the first subset and the second subset based at least in part on one or more characteristics associated with the call, the first module data, the second module data, or any combination thereof, wherein transmitting the first response and the second response is based at least in part on the categorizing.

\* \* \* \* \*